(12) United States Patent
Hattori

(10) Patent No.: US 7,879,173 B2
(45) Date of Patent: Feb. 1, 2011

(54) METHOD FOR LAYING A SHEET OVER A BASE MATERIAL

(75) Inventor: Yukio Hattori, Aichi (JP)

(73) Assignee: Meinan Machinery Works, Inc., Obu-shi (JP)

( * ) Notice: Subject to any disclaimer, the term of this patent is extended or adjusted under 35 U.S.C. 154(b) by 389 days.

(21) Appl. No.: 12/002,766

(22) Filed: Dec. 19, 2007

(65) Prior Publication Data

US 2008/0149262 A1 Jun. 26, 2008

(30) Foreign Application Priority Data

Dec. 26, 2006 (JP) ............................ 2006-348865
May 18, 2007 (JP) ............................ 2007-132240

(51) Int. Cl.
*B29C 65/00* (2006.01)
(52) U.S. Cl. ..................... 156/196; 144/345; 144/381; 414/802
(58) Field of Classification Search ............. 156/307.1, 156/307.3, 307.7, 566, 568, 570, 571, 572, 156/580, 583.1, 196; 414/791, 802; 144/245.5, 144/345, 346, 349, 359, 381
See application file for complete search history.

(56) References Cited

U.S. PATENT DOCUMENTS

| 6,878,230 | B2 * | 4/2005 | Abe et al. ................ 156/304.5 |
| 2003/0181124 | A1 * | 9/2003 | Lee et al. ..................... 445/25 |
| 2004/0223111 | A1 * | 11/2004 | Kamiya et al. .............. 349/177 |

* cited by examiner

*Primary Examiner*—John L Goff
(74) *Attorney, Agent, or Firm*—Edwards Angell Palmer & Dodge LLP

(57) ABSTRACT

A method for laying a sheet over the lower surface of a base material disposed in a generally horizontal position. According to the method, the base material is supported at the lower surface thereof by a first support means, and the sheet is placed immediately below and in facing relation to the lower surface of the base material and then supported at the lower surface thereof by a second support means. The sheet and the base material are made to be in contact with each other over partial surfaces thereof. Subsequently, the first support means is moved away from the base material and the sheet and the base material are placed together on a rigid horizontal surface so that the sheet is laid substantially over the entire lower surface of the base material.

9 Claims, 36 Drawing Sheets

Fig. 19
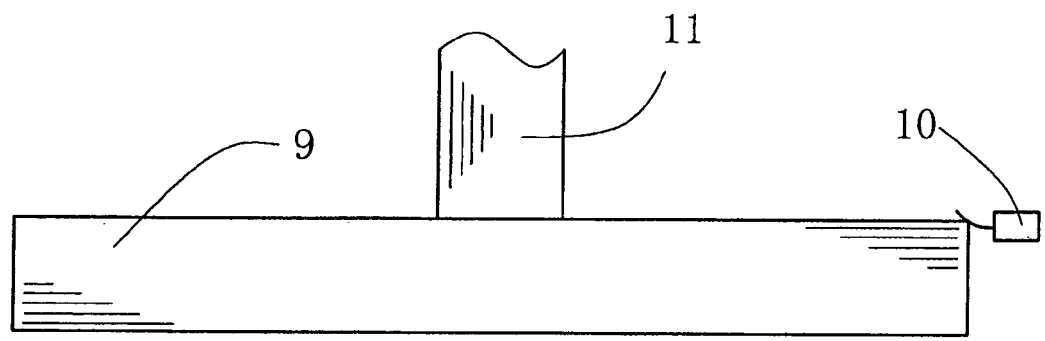
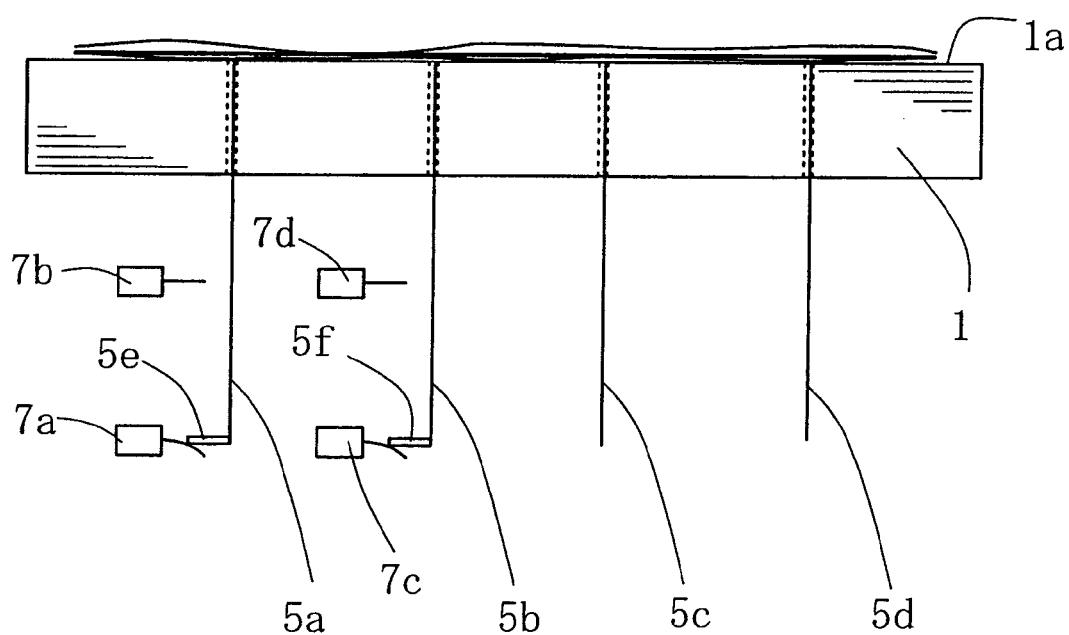

Fig. 21
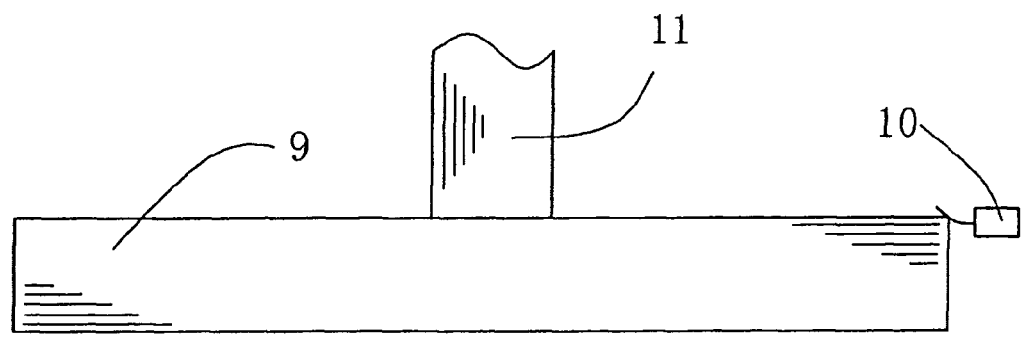
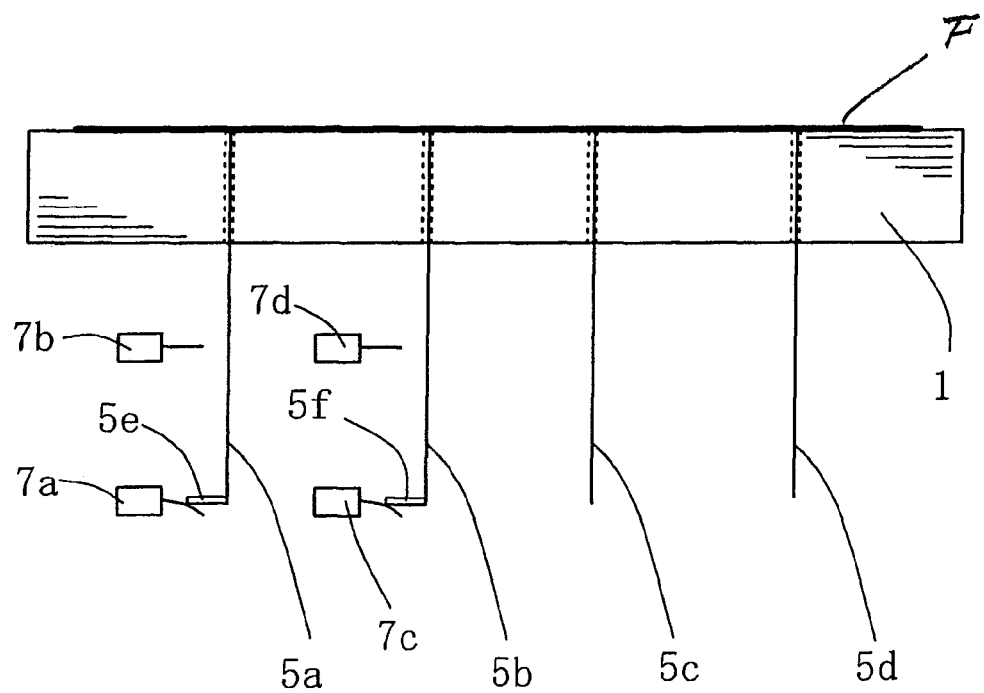

Fig. 30
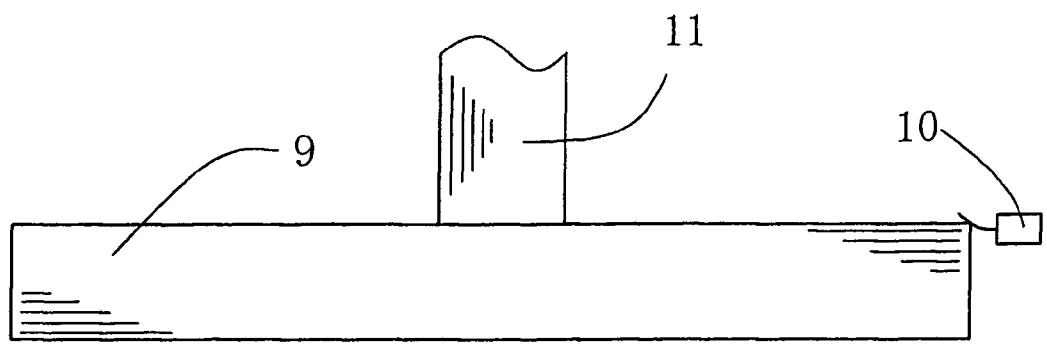
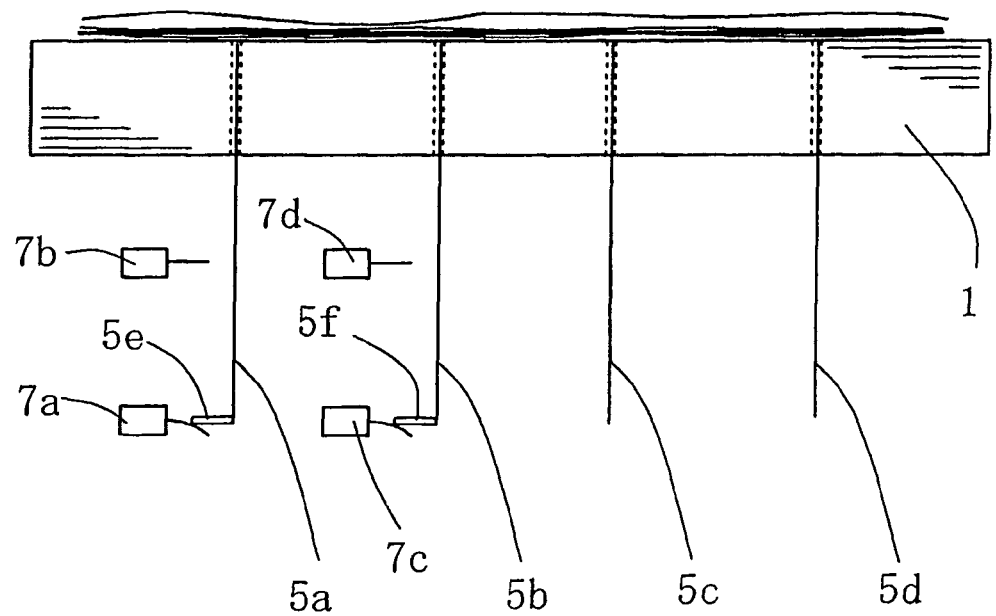

METHOD FOR LAYING A SHEET OVER A BASE MATERIAL

FIELD OF THE INVENTION

1. Background of the Invention

The present invention relates to a method for laying a sheet such as a veneer sheet over the lower surface of a base material in the form of a sheet or a board which is disposed generally in a horizontal position.

2. Description of the Related Art

U.S. Pat. No. 6,878,230 discloses a method for manufacturing glued laminated wood such as laminated veneer lumber (LVL) composed of a number of veneer sheets which are laminated together by a hot press with a thermosetting adhesive into a continuous length of multiple-layered board wherein the end joints of veneer sheets are disposed in a staggered array. According to one method of this related art, an initial base material made of a plurality of veneer sheets glued together in a staggered array and in a layered structure is firstly prepared and then veneer sheets each having an adhesive coating on one face thereof are fed and laid on opposite sides of the base material and hot pressed. In laying a veneer sheet onto the base material, the base material is moved in place by a conveyer and supported there by the same conveyer. In placing a veneer sheet, particularly, onto a lower surface of the base material, the veneer sheet is fed to a movable metal carrier and the carrier is moved onto the upper surface of a lower heated plate of the hot press, so that the veneer sheet is pressed together with the metal carrier to the base material.

According to the above method of the related art, part of the base material to which veneer sheets are bonded by adhesive is moved into the pressing region between paired heated plates of the hot press and the base material must be supported by the conveyer during the veneer sheet laying operation. In other words, the laying operation could not be done successfully unless the base material is securely supported by any suitable means.

Alternatively, glued laminated wood or board may be made of a number of veneer sheets of substantially the same size which are laminated one on another and glued together until the board with the desired thickness is made. However, no method has been proposed heretofore according to which a veneer sheet can be laid over the lower surface of a base material or a board in process.

Therefore, an object of the present invention is to provide a method for laying a sheet such as a veneer sheet over the lower surface of a base material in the form of a sheet or a board which is disposed generally in a horizontal position.

SUMMARY OF THE INVENTION

In order to achieve the above object, the present invention provides a method for laying a sheet such as a veneer sheet over the lower surface of a base material disposed in a generally horizontal position, according to which the base material is supported at the lower surface thereof by a first support means and the sheet is placed immediately below and in facing relation to the lower surface of the base material. The sheet is then supported at the lower surface thereof by a second support means which is disposed horizontally spaced away from the first support means. Then the sheet and the base material are made to be in contact with each other over partial surfaces thereof, e.g. by elevating the second support means. Subsequently, the first support means is moved away from the base material, and the sheet and the base material set in contact with each other over partial surface thereof are placed together on a rigid horizontal surface so that the sheet is laid substantially over the entire lower surface of the base material.

Features and advantages of the present invention will become more apparent to those skilled in the art from the following description of embodiments of the invention, which description is made with reference to the accompanying drawings, wherein:

BRIEF DESCRIPTION OF THE DRAWINGS

FIGS. 4 through 21 are schematic illustrative views showing various steps of operation of the apparatus of FIG. 1 in performing a preferred embodiment of the method according to the present invention; and FIGS. 22 through 36 are schematic illustrative views showing various steps of operation in modified apparatuses and also in various modified embodiments of the present invention.

DETAILED DESCRIPTION OF EXEMPLARY EMBODIMENTS

The following will describe exemplary embodiments according to the present invention while having reference to the drawings.

Figure 1:
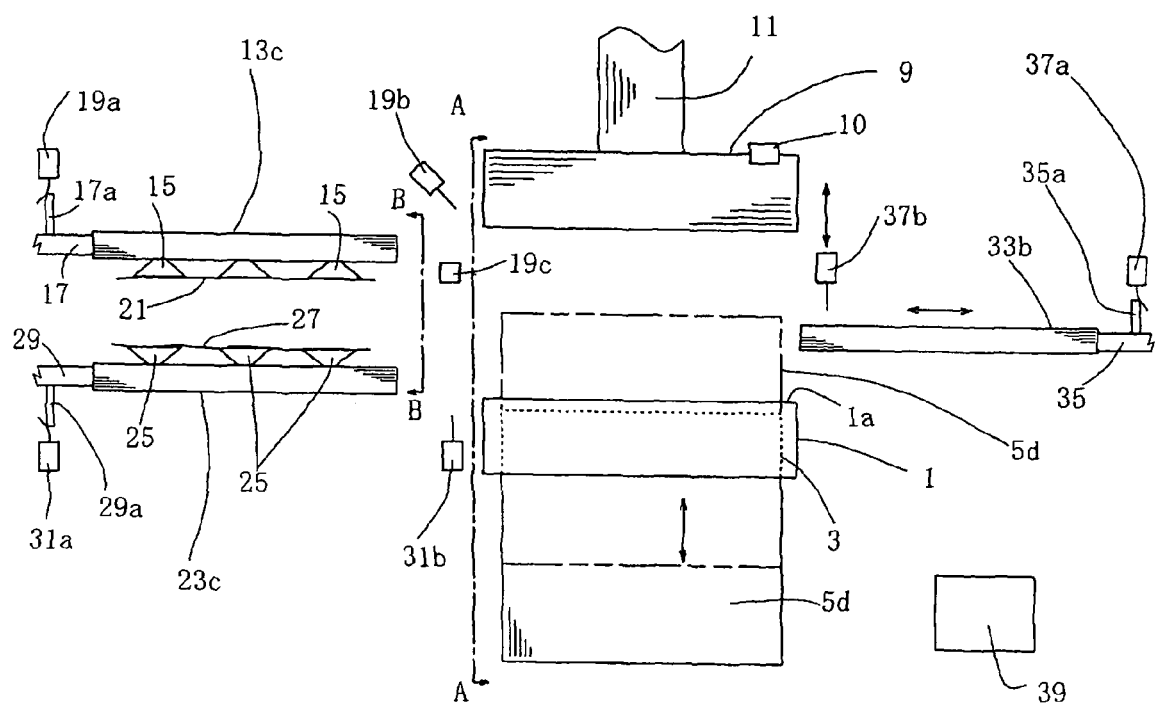
FIG. 1 is a schematic front view of an apparatus for performing the method of the present invention.
Figure 2:
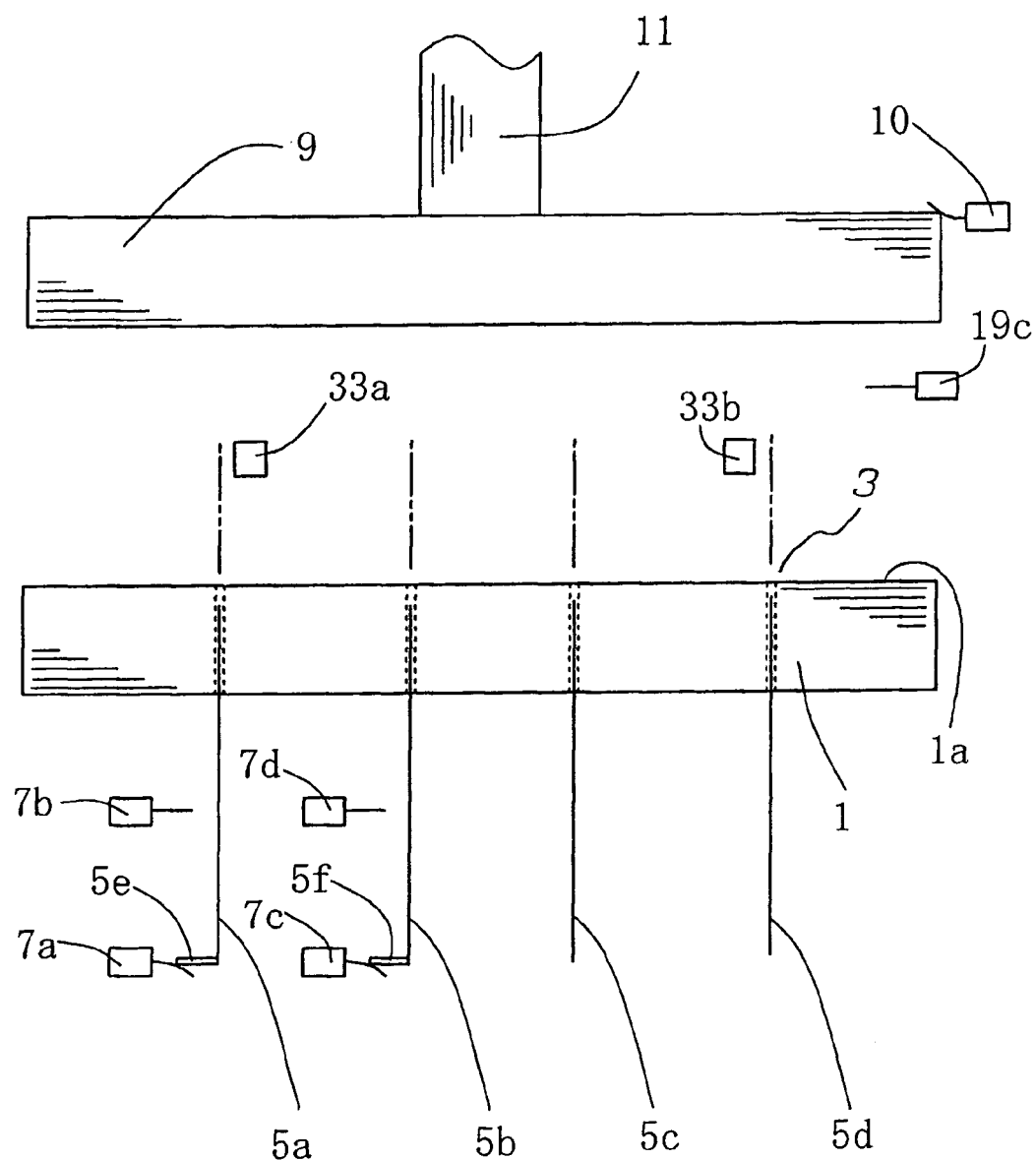
FIG. 2 is a schematic side view showing a part of the apparatus of FIG. 1 as viewed from chain line A-A of FIG. 1 in arrow direction.
Figure 3:
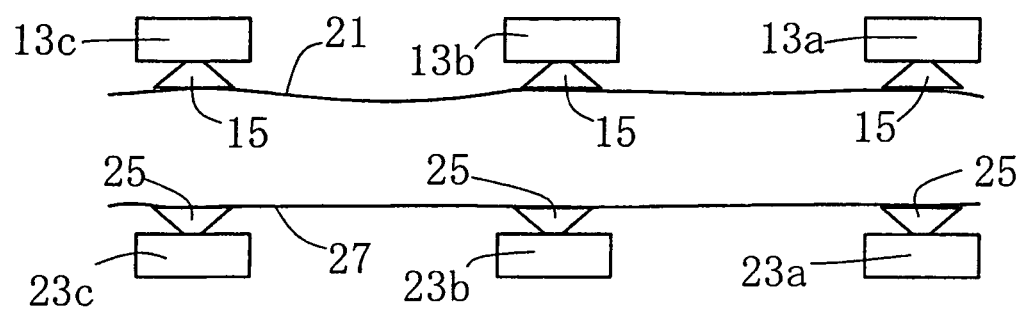
FIG. 3 is a schematic view showing a part of the apparatus of FIG. 1 as viewed from chain line B-B of FIG. 1 in arrow direction.

Referring to FIGS. 1 through 3 showing the apparatus for performing the method of the present invention, the apparatus has a stationary lower plate 1 which is located at a predetermined fixed position in a horizontal disposition in the apparatus and heated to any desired temperature by any suitable heat source such as steam. The horizontal extent of the stationary lower heated plate 1 as viewed in FIG. 1 is the width and the horizontal extend as viewed in FIG. 2 is the length, respectively. The stationary lower heated plate 1 serves as a rigid horizontal surface or a rigid support of the apparatus for performing the present invention. As indicated by dotted line in FIG. 2, the lower heated plate 1 has formed therethrough four vertical slots 3 spaced at a predetermined interval in the longitudinal direction of the lower heated plate 1. The slots 3 receive therein support plates 5a, 5b, 5c, 5d, serving as the second support means of the present invention, which are vertically movable in the slots 3 relative to the lower heated plate 1 between the elevated position indicated by chain double-dashed lines in FIGS. 1 and 2 where the top ends of the support plates 5a, 5b, 5c, 5d are located above the top surface 1a of the lower heated plate 1 and the lowered retracted position indicated by dotted and solid lines in FIGS. 1 and 2 where the top ends are located slightly below the top surface 1a of the lower heated plate 1. Each of the support plates 5a, 5b, 5c, 5d of the apparatus of FIGS. 1 and 2 has a thickness of about 10 mm.

Of the four support plates 5a, 5b, 5c, 5d, two inner support plates 5b, 5c are connected to a common actuator such as rack-and-pinion drive (not shown in the drawing) so that these two support plates 5b, 5c are vertically movable in unison with each other, and the other two outer support plates 5a, 5d located adjacent to the opposite sides of the lower heated plate 1 are connected to another similar actuator or rack-and-pinion drive (not shown either) for vertical movement in unison with each other. For the sake of explanation, the rack-and-pinion drive for the support plates 5b, 5c will be referred to as the rack-and-pinion drive A, while the counterpart for the support plates 5a, 5d as the rack-and-pinion drive B. These two rack-and-pinion drives A and B are connected to a control unit 39, which will be described in detail later.

Referring specifically to FIG. 2, the support plate 5a has at the bottom thereof a projection 5e extending horizontally and movable with the support plate 5a into contact with a limit switch 7a for detecting the arrival of the support plates 5a, 5d at their lowered position and also into contact with a limit switch 7b spaced vertically above the limit switch 7a for detecting the arrival of the support plates 5a, 5d at their elevated position. Similarly, the support plate 5b has at the bottom thereof a projection 5f which is movable with the support plate 5b into contact with a limit switch 7c and another limit switch 7d for detecting the arrival of the support plates 5b, 5c at their lowered position and elevated position, respectively.

The apparatus further has a movable upper heated plate 9 arranged in a horizontal disposition. The plate 9 is movable vertically toward and away from the aforementioned stationary lower heated plate 1, or between the lowered operative position (FIG. 10) and the elevated standby position (FIG. 1), by means of a hydraulically operated piston rod 11 of a hydraulic cylinder (not shown). Thus, the movable upper heated plate 9 and the stationary lower heated plate 1 cooperate to make a hydraulic hot press.

A limit switch 10 is provided for detecting the arrival of the upper heated plate 9 at its elevated standby position. The limit switch 10 is located at such a position in the apparatus that it will not be actuated by the upper heated plate 9 before the first veneer feeders 13a, 13b, 13c (which will be described later) are moved to the position as shown in FIG. 5.

Figure 10:
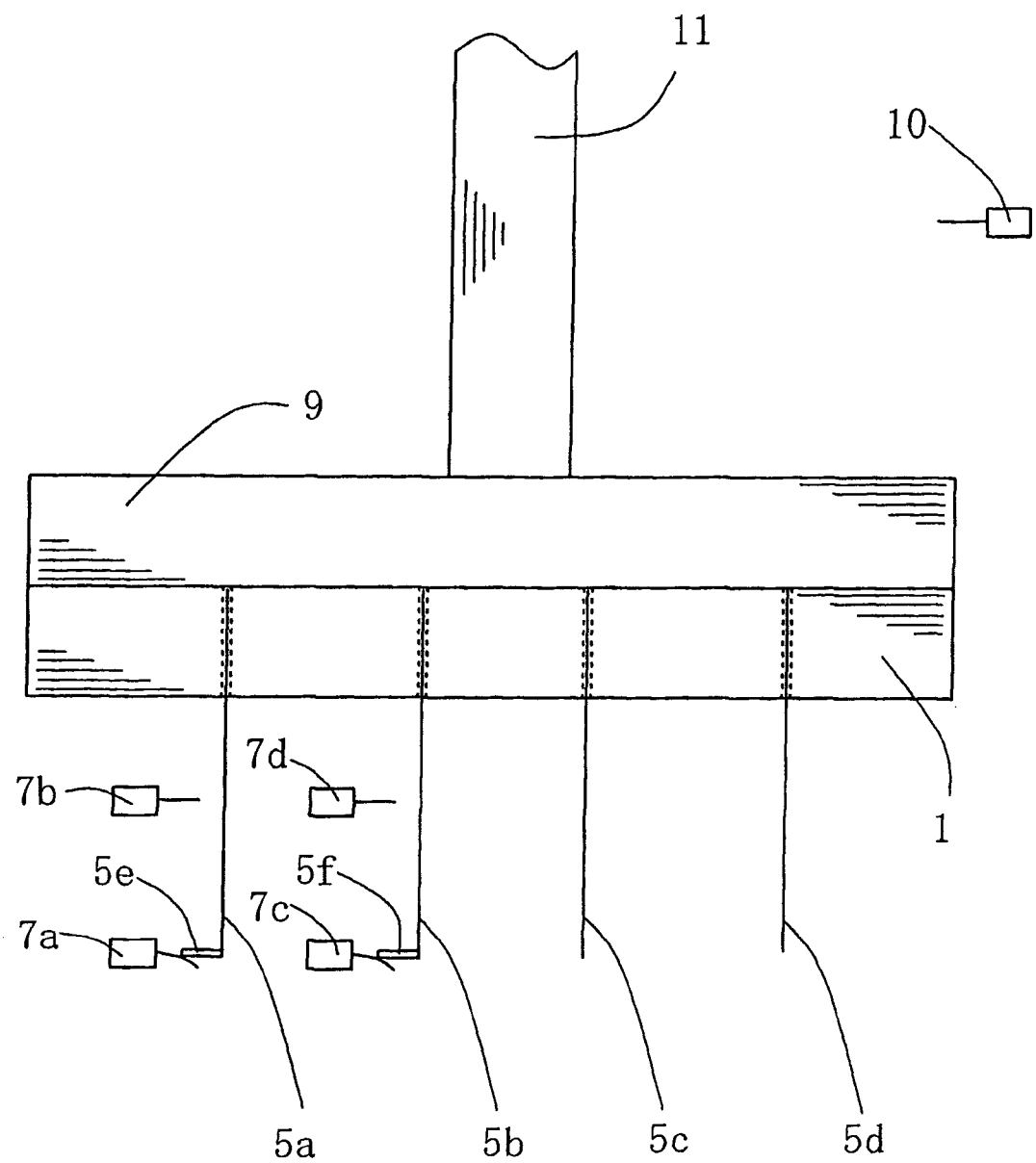

The hydraulic cylinder (not shown) for the piston rod 11 is operable in response to a signal transmitted by the aforementioned control unit 39 which receives detection signals from the limit switch 10 and a pressure sensor (not shown) that is operable to detect the hydraulic cylinder pressure corresponding to the desired pressure, e.g. 8 kg/cm$^2$, for application to veneer sheets to be pressed by and between the upper and lower heated plates 9, 1, e.g. as shown in FIG. 10.

Referring to FIGS. 1 and 3, three first veneer feeders 13a, 13b, 13c are arranged at a predetermined spaced interval in the longitudinal direction of the stationary lower heated plate 1, each having on the bottom thereof a plurality of suction pads 15 (three pads being shown in the present embodiment) which are provided at a predetermined spaced interval in the widthwise direction of the plate 1, as shown in FIG. 1. The suction pads 15 are connected to a vacuum device (not shown) through a flexible tube (not shown either) for holding by vacuum a veneer sheet at the upper surface thereof, as shown in FIG. 1. The first veneer feeders 13a, 13b, 13c are operable to be activated or deactivated by a signal from the control unit 39.

Figure 4:
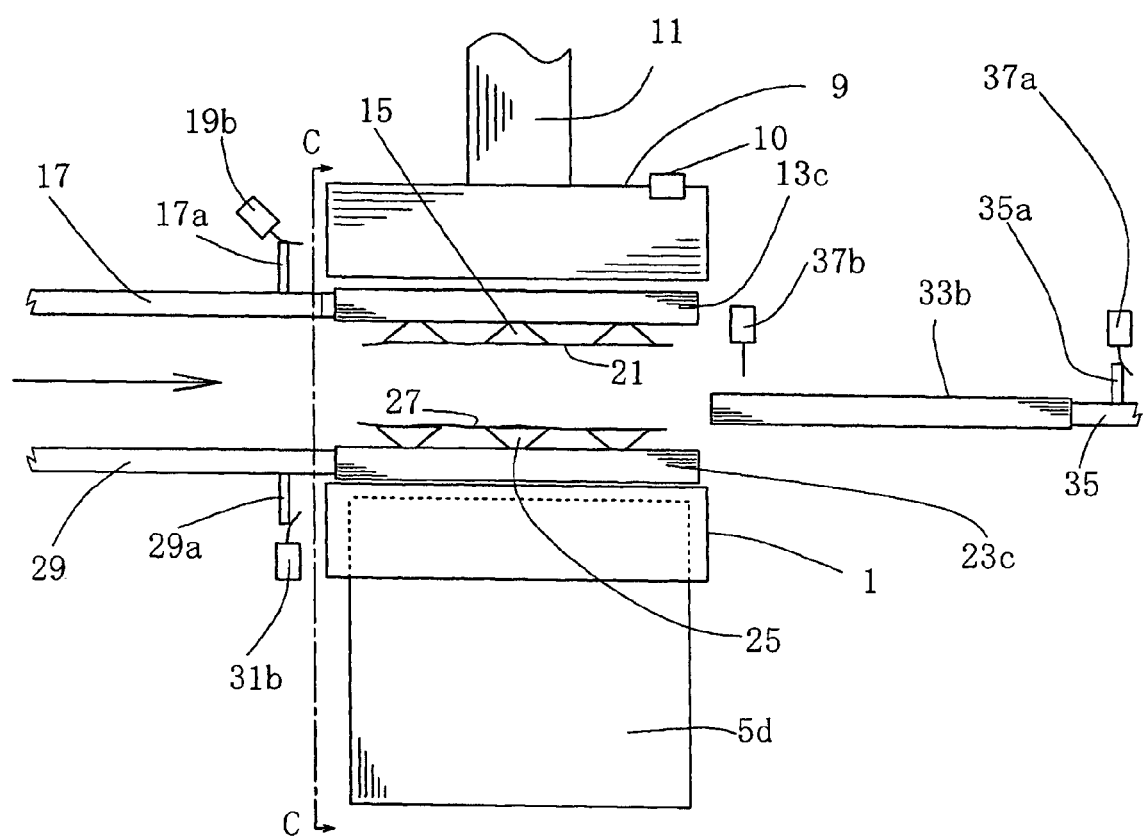
Figure 5:
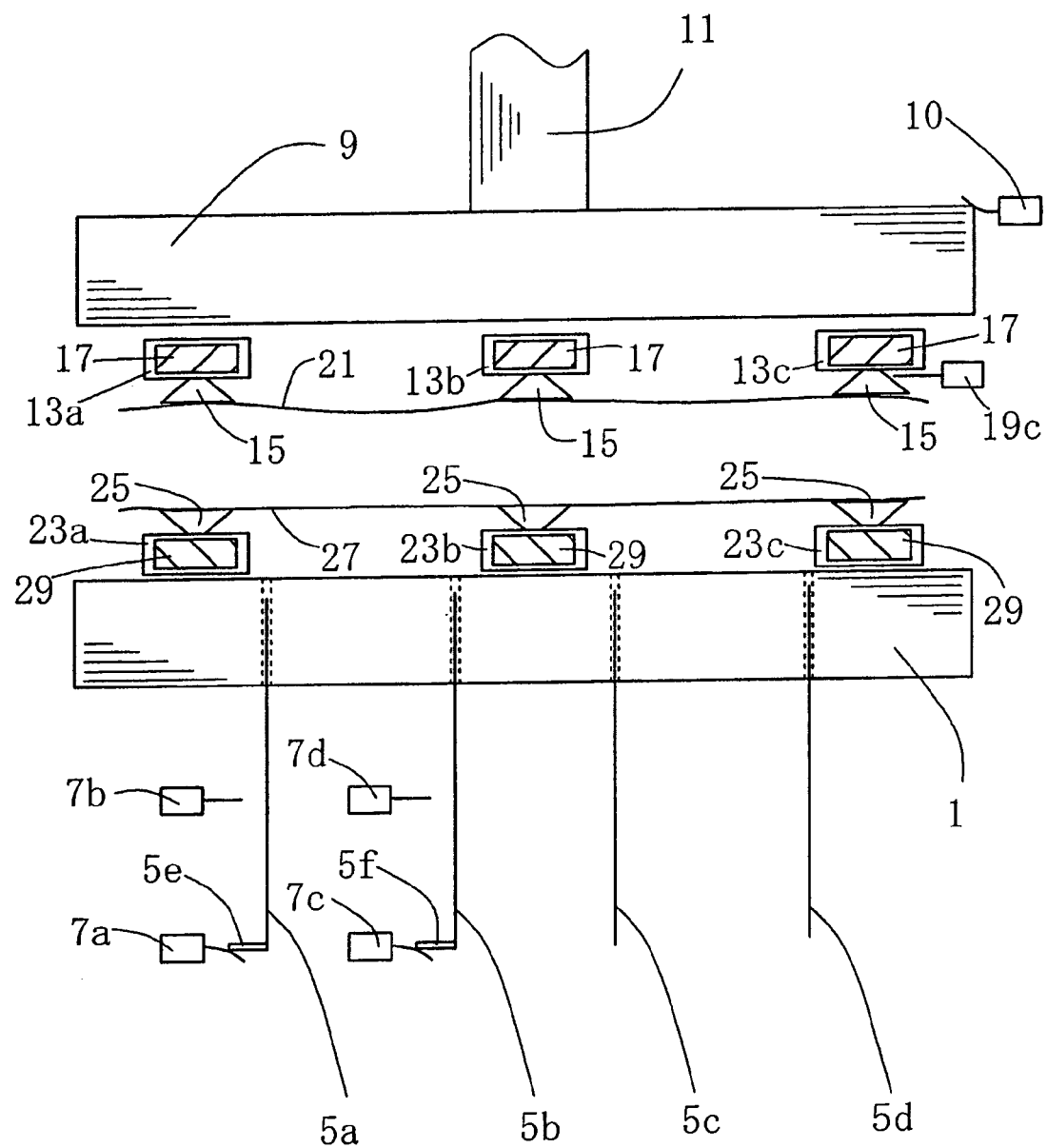

The first veneer feeders 13a, 13b, 13c are fixedly mounted to first actuators 17 which are operable to move the veneer feeder 13a, 13b, 13c together between the retracted standby position shown in FIG. 1 and the first position between the upper and lower heated plates 9, 1, e.g. as shown in FIGS. 4 and 5. The vertical position of the first actuators 17 relative to the upper heated plate 9 in its elevated standby position (FIG. 1) is set such that none of the first veneer feeders 13a, 13b, 13c will hit against the upper heated plate 9 when the feeders 13a, 13b, 13c are moved to their first position.

As will be described later in detail, a number of veneer sheets are bonded together by the hot press 1, 9 into a glued laminated board having the desired thickness. The vertical position of the first actuators 17 relative to the support plates 5a, 5b, 5c, 5d in their elevated position is set such that the distance between the suction pads 15 of the first veneer feeders 13a, 13b, 13c and the top surface of a glued laminated board which is still in process just before the last two veneer sheets are laid over the top and bottom surfaces thereof and supported between the upper and lower heated plates 9, 1 by the support plates 5a, 5b, 5c, 5d in their elevated position is about 150 mm. This 150 mm distance is determined with bending or waviness of veneer sheets taken into consideration. In other words, the vertically spaced distance between the top ends of the support plates 5a, 5b, 5c, 5d in their elevated position and the suction pads 15 corresponds to the sum of the thickness of the above glued laminated board in process and the distance of 150 mm.

Figure 7:
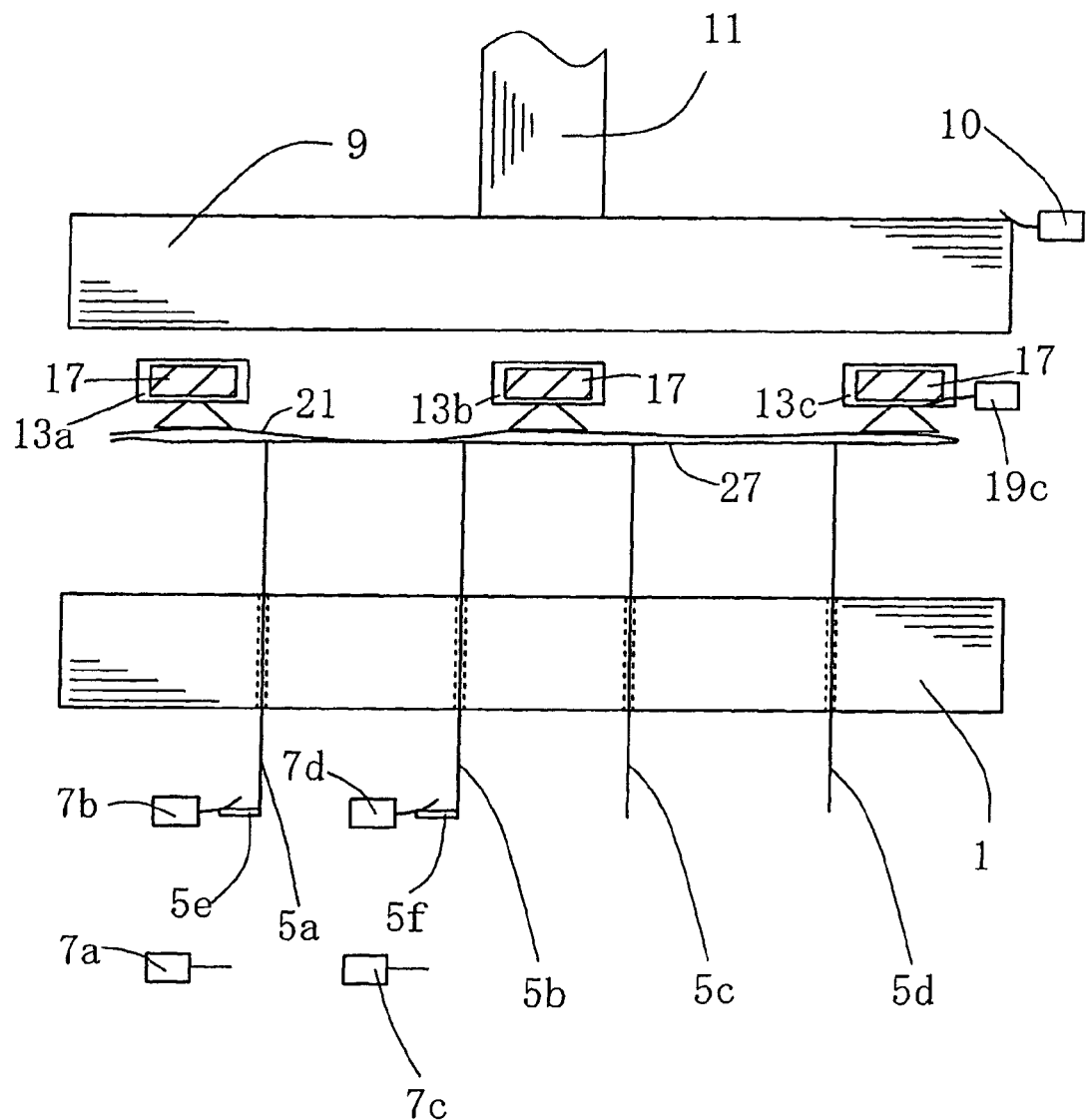

The first actuator 17 for the first veneer feeder 13c has a vertical projection 17a movable therewith, and a limit switch 19a is provided at such a position that it is struck by the projection 17a when the first actuators 17 and hence the first veneer feeders 13a, 13b, 13c have moved to their retracted position (FIG. 1), thereby detecting the arrival of the first veneer feeders 13a, 13b, 13c at their retracted standby position. Another limit switch 19b is provided adjacent to the upper heated plate 9 in its elevated position in such a way that the limit switch 19b is struck by the vertical projection 17a of the first actuator 17 when first veneer feeders 13a, 13b, 13c are moved by the first actuators 17 forward to the aforementioned first position or moved upward in the space between the plates 1, 9 to the same first position, as will be described in detail in later part hereof, for detecting the arrival of the first veneer feeders 13a, 13b, 13c at the first position thereof. Still another limit switch 19c is provided adjacent to the opposite side of the upper heated plate 9 so as to be actuated by the vertical projection 17a of the first actuator 17 for detecting the arrival of the first veneer feeder 13a, 13b, 13c at a predetermined position by downward movement of the first actuators 17 and hence of the veneer feeder 13a, 13b, 13c from the first position, as will be described in detail in later part hereof. The first veneer feeder 13a, 13b, 13c in the position below the first position are shown in FIG. 7 and this position will be referred to as the second position of the first veneer feeder 13a, 13b, 13c.

The vacuum device (not shown) connected to the suction pads 15 of the first veneer feeders 13a, 13b, 13c is operable in response to a command signal provided by the control unit 39 which receives detection signals from the limit switches 19a, 19c and other signals, as will be described more detail in later part hereof.

Reference symbols 23a, 23b, 23c (FIGS. 1 and 3) designate second veneer feeders each having on the top thereof a plurality of suction pads 25 (three suction pads in the preferred embodiment) which are connected to the aforementioned vacuum device (not shown) through a flexible tube (not shown) for holding by vacuum a veneer sheet at the lower surface thereof. The second veneer feeders 23a, 23b, 23c are also operable to be activated or deactivated from a signal transmitted from the control unit 39.

These second veneer feeders 23a, 23b, 23c are fixedly mounted to their respective second actuators 29 which are operable to move the second veneer feeders 23a, 23b, 23c together. The second actuator 29 for the second veneer feeder 23c has a vertical projection 29a movable therewith, and a limit switch 31a is located such that it can be struck by the vertical projection 29a for detecting the arrival of the first veneer feeders 23a, 23b, 23c at their retracted standby position shown in FIG. 1. Another limit switch 31b is located adjacently to one side of the lower heated plate 1 so as to be struck by the vertical projection 31a of the second actuator 29 for detecting the arrival of the second veneer feeders 23a, 23b, 23c at the advanced position between the upper and lower heated plates 9, 1, as shown in FIG. 4. It may be so arranged that the suction pads 25 of the second veneer feeders 23a, 23b, 23c are operable to be activated or deactivated by any suitable valve which is actuable by a command signal from the control unit 39 independently of another similar valve for the suction pads 15 of the first veneer feeders 13a, 13b, 13c.

Figure 12:
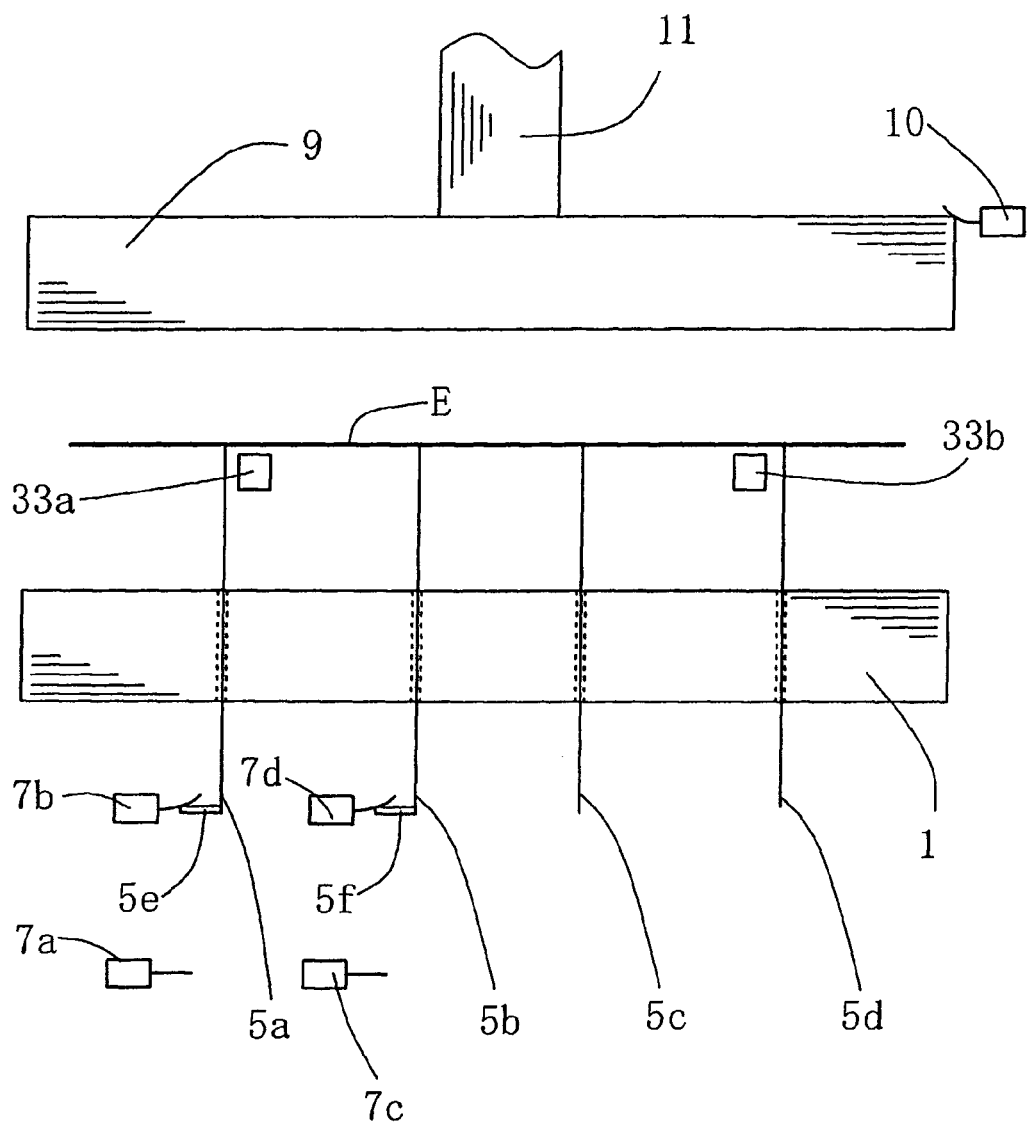

On the opposite side of the heated plates 1, 9 as viewed from the first and second veneer feeders 13a, 13b, 13c and 23a, 23b, 23c are provided a pair of horizontally spaced support bars 33a, 33b, as shown in FIGS. 1 and 2, serving as the first support means of the present invention. As shown in FIG. 2, the support bars 33a, 33b horizontally spaced away from any of the support plates 5a, 5b, 5c, 5d. In other words, the inner two support plates 5b, 5c are located within the spaced distance of the paired support bars 33a, 33b, while the outer two support plates 5a, 5d are located outside the spaced distance. The support bars 33a, 33b are provided at such a height that the top surfaces thereof are slightly lower than the top ends of the support plates 5a, 5d in their elevated position, as shown in FIGS. 2 and 12. The paired support bars 33a, 33b are horizontally reciprocally movable as indicated by double-headed arrow by a common actuator 35 between the retracted standby position shown in FIG. 1 and the advanced position between the upper and lower heated plates 9, 1, e.g. as shown in FIG. 12 and indicated by dotted line in FIG. 13. A vertical projection 35a is fixedly mounted to the actuator 35 for the support bars 33a, 33b. There are provided limit switches 37a, 37b which are actuable by the projection 35a of the horizontally movable support bar actuator 35 for detecting the arrival of the support bars 33a, 33b at the their retracted and advanced positions, respectively.

As is obvious from the foregoing description, various detection signals generated by the limit switches and other switches and sensors are transmitted to the control unit 39 which in turn generates a command signal for controlling the operation of various devices and equipment of the apparatus.

The following will describe the operation of the above-described apparatus.

FIG. 1 shows the apparatus in its initial standby state, wherein the upper heated plate 9 is placed in its elevated position and the support plates 5a, 5b, 5c, 5d, the first veneer feeders 13a, 13b, 13c, the second veneer feeders 23a, 23b, 23c and the support bars 33a, 33b are all placed in their retracted standby positions, respectively. In this initial state of the apparatus, the aforementioned vacuum device connected to the first and second veneer feeders 13a, 13b, 13c and 23a, 23b, 23c are set in operation with their valves opened, so that a veneer sheet 21 having its lower surface coated with a thermosetting adhesive (referred to merely as "adhesive" hereinafter) is held by the suction pads 15 of the first veneer feeders 13a, 13b, 13c and another veneer sheet 27 having substantially the same thickness as the veneer sheet 21 and having no adhesive coating is held by the suction pads 25 of the second veneer feeders 23a, 23b, 23c in the same orientation as and in facing relation to the veneer sheet 21, as shown in FIGS. 1 and 3. Such arrangement of veneer sheets 21, 27 may be done manually by a workman. Veneer sheets to be used by the apparatus for manufacturing of a glued laminated board, including the above veneer sheets 21, 27, are of a rectangular shape having a length of about 3,000 mm as measured in the wood grain direction of the veneer sheet, a width of about 1,300 mm as measured across the wood grain direction and a thickness of about 3 mm. The horizontal extent of the veneer sheets 21, 27 as seen in FIG. 1 is the width and the horizontal extent thereof as seen in FIG. 3 is the length, respectively.

With the apparatus set in the above initial arrangement, the operator of the apparatus provides a start command signal to the control unit 39, which then generates a signal to cause the first and second actuators 17, 29 to move synchronously forward or rightward as seen in FIG. 1 (or in arrow direction as shown in FIG. 4) so that the first veneer feeders 13a, 13b, 13c and the second veneer feeders 23a, 23b, 23c are also moved forward synchronously into the space between the upper and lower heated plates 9, 1. When the limit switch 19b is struck by the projection 17a of the advancing first actuator 17 thereby to detect the arrival of the veneer feeders 13a, 13b, 13c at the first position thereof, the limit switch 19a transmits a detection signal to the control unit 29 which in response to the detection signal generates a command signal to stop the movement of the first veneer feeders 13a, 13b, 13c. When the limit switch 31b is struck by the projection 29a of the second actuator 29, the movement of the second veneer feeders 23a, 23b, 23c is stopped in the same manner as in the case of the first veneer feeders 13a, 13b, 13c. As a result, the first veneer feeders 13a, 13b, 13c holding the veneer sheet 21 is moved to its first position between the heated plates 1, 9 and the second veneer feeders 23a, 23b, 23c holding the veneer sheet 27 to its advanced position between the heated plates 1, 9, as shown in FIGS. 4 and 5.

Figure 6:
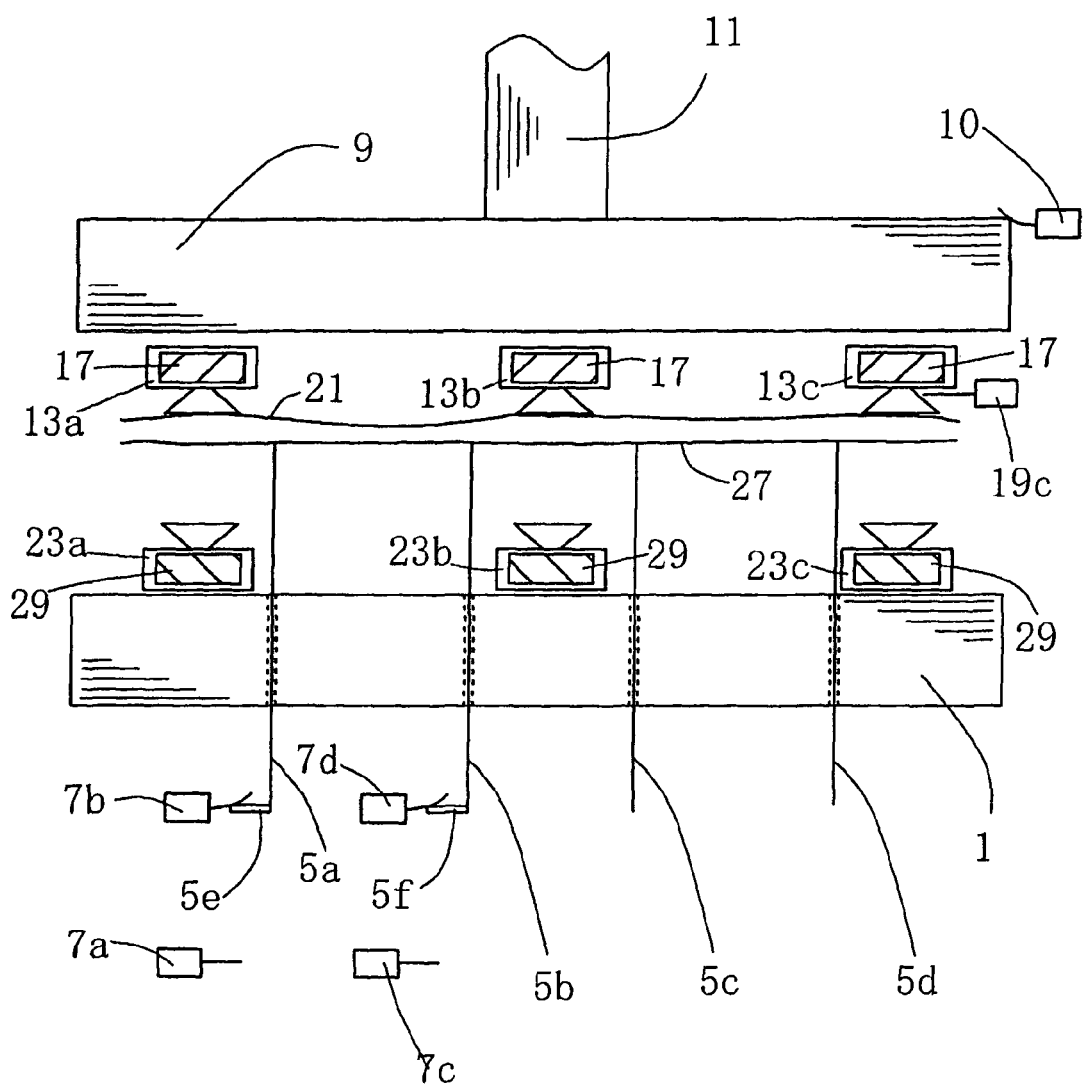

Upon receiving the detection signals from both of the limit switches 19b, 31b, the control unit 39 then generates a command signal to close the valve for the second veneer feeders 23a, 23b, 23c thereby to stop holding of the veneer sheet 27 by vacuum of the second veneer feeders 23a, 23b, 23c and subsequently another command signal is provided to energize the rack-and-pinion drives A, B thereby to elevate the support plates 5a, 5d and 5b, 5c synchronously. As the limit switch 7b is struck by the projection 5e of the moving support plate 5a and generates a detection signal accordingly, the control unit 39 responding to the detection signal causes the rack-and-pinion drive B to stop its operation so that the elevating movement of the support plates 5a, 5d is stopped. Simultaneously, as the limit switch 7d is actuated by the projection 5f of the moving veneer supporting plate 5b, the operation of the other rack-and-pinion drive A is stopped and the elevating movement of the support plates 5b, 5c is also stopped. Veneer sheet 27 then free from the suction pads 15 is lifted by the support plates 5a, 5b, 5c, 5d from the position of FIG. 5 to the position of FIG. 6.

In response to the above detection signals from the limit switches 7b, 7d, the control unit 39 also generates the following two command signals. According to the first signal, the control unit 39 causes the first actuators 17 to move downward to a position where the limit switch 19c is struck by the first actuator 17 for the first veneer feeder 13c and the first veneer feeders 13a, 13b, 13c are placed in the aforementioned second position, as shown in FIG. 7. According to the second signal, the second actuators 29 are moved in retracting direction until the limit switch 31a is struck by the projection 29a of the second actuator 29 for the second veneer feeder 23c, so that the second veneer feeders 23a, 23b, 23c are placed in their retracted standby position of FIG. 1. As a result, the veneer sheet 21 held by vacuum of the suction pads 15 of the first veneer feeders 13a, 13b, 13c is brought close to the veneer sheet 27 which is supported by the support plates 5a, 5b, 5c, 5d, as shown in FIG. 7.

Figure 8:
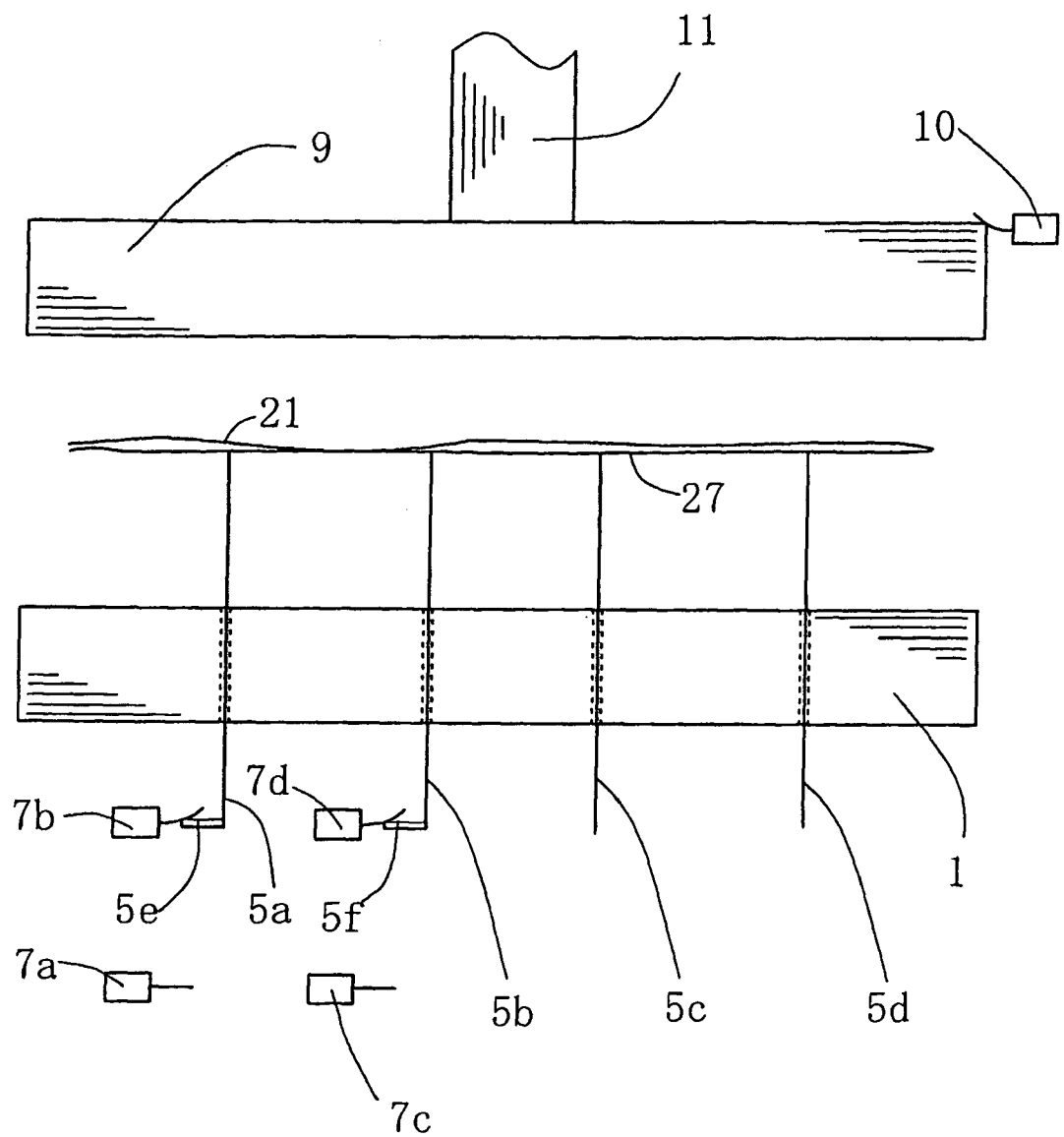

After elapse of a short period of time, e.g. one second, since the limit switch 19c was actuated by the first actuator 17 for the first veneer feeder 13c, the control unit 39 causes the valve in flexible tube connected to the first veneer feeders 13a, 13b, 13c to be closed, so that veneer sheet 21 is released from holding by the first veneer feeders 13a, 13b, 13c and superposed or laid over the veneer sheet 27. Then, the control unit 39 provides a command signal which causes the first actuators 17 to move upward until the first veneer feeders 13a, 13b, 13c are moved to their first position where the limit switch 19b is struck by the projection 17a of the actuator 17 for the first veneer feeder 13c and then another command signal to move the first actuators 17 in horizontal direction away from the hot press 1, 9 until the limit switch 19a is actuated by the projection 17a, so that the first veneer feeders 13a, 13b, 13c are moved to their original retracted standby position. As a result, two veneer sheets 21, 27 one superposed over the other between the upper and lower heated plates 9, 1 are supported by the support plates 5a, 5b, 5c, 5d, as shown in FIG. 8.

Figure 13:
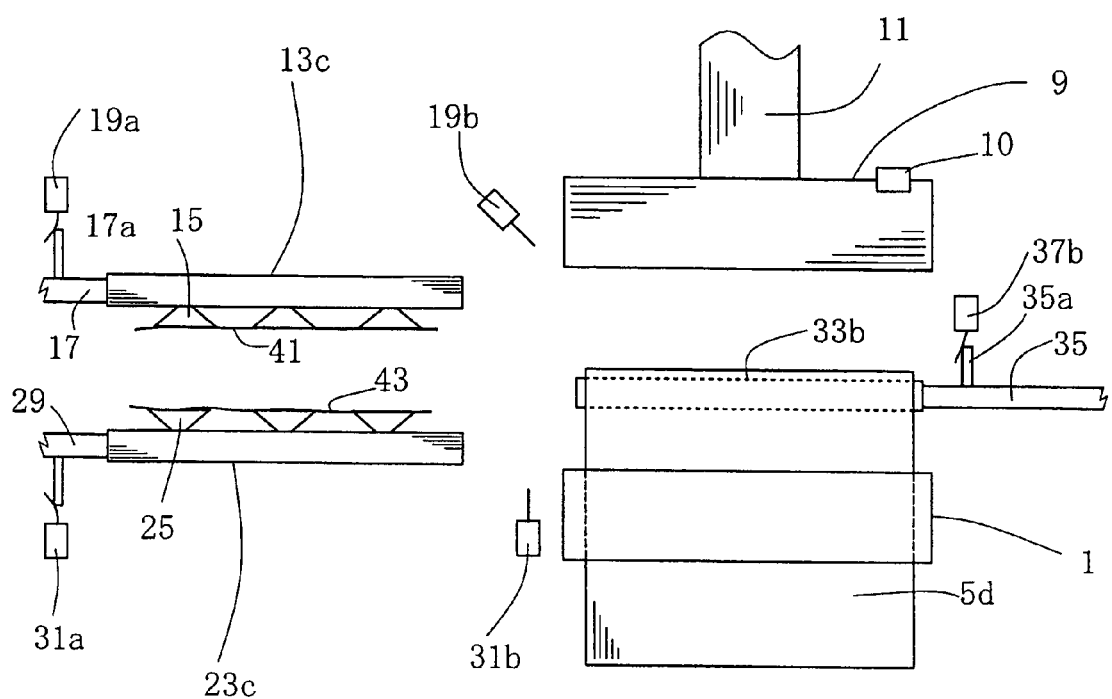

After both first and second veneer feeders 13a, 13b, 13c and 23a, 23b, 23c have been moved back to their standby positions of FIG. 1, the valves are opened thereby to activate the suction pads 15, 25 for the first and second veneer feeders 13a, 13b, 13c and 23a, 23b, 23c. With the suction pads 15, 25 thus activated, a veneer sheet 41 having on the lower surface thereof an adhesive coating is set so as to be held by vacuum of the suction pads 15 for the first veneer feeders 13a, 13b, 13c in the same orientation as the previous veneer sheet 21 and another veneer sheet 43 having on the upper surface thereof an adhesive coating is set on the suction pads 25 for the second veneer feeders 23a, 23b, 23c so as to be held by vacuum of the suction pads 25 in the same orientation as the veneer sheet 27, as shown in FIG. 13. These operations may be performed manually by a workman.

As will be understood from the following description of the present embodiment, each time the first and second veneer feeders 13a, 13b, 13c and 23a, 23b, 23c are retracted to their standby positions, a veneer sheet 45, 49, 53 and so forth each having an adhesive coating on the lower surface thereof is set to be held by the first veneer feeders 13a, 13b, 13c in the same orientation and a veneer sheet 47, 51, 55 and so forth each having on its upper surface an adhesive coating is set on and held by the second veneer feeders 23a, 23b, 23c in the same orientation.

Figure 9:
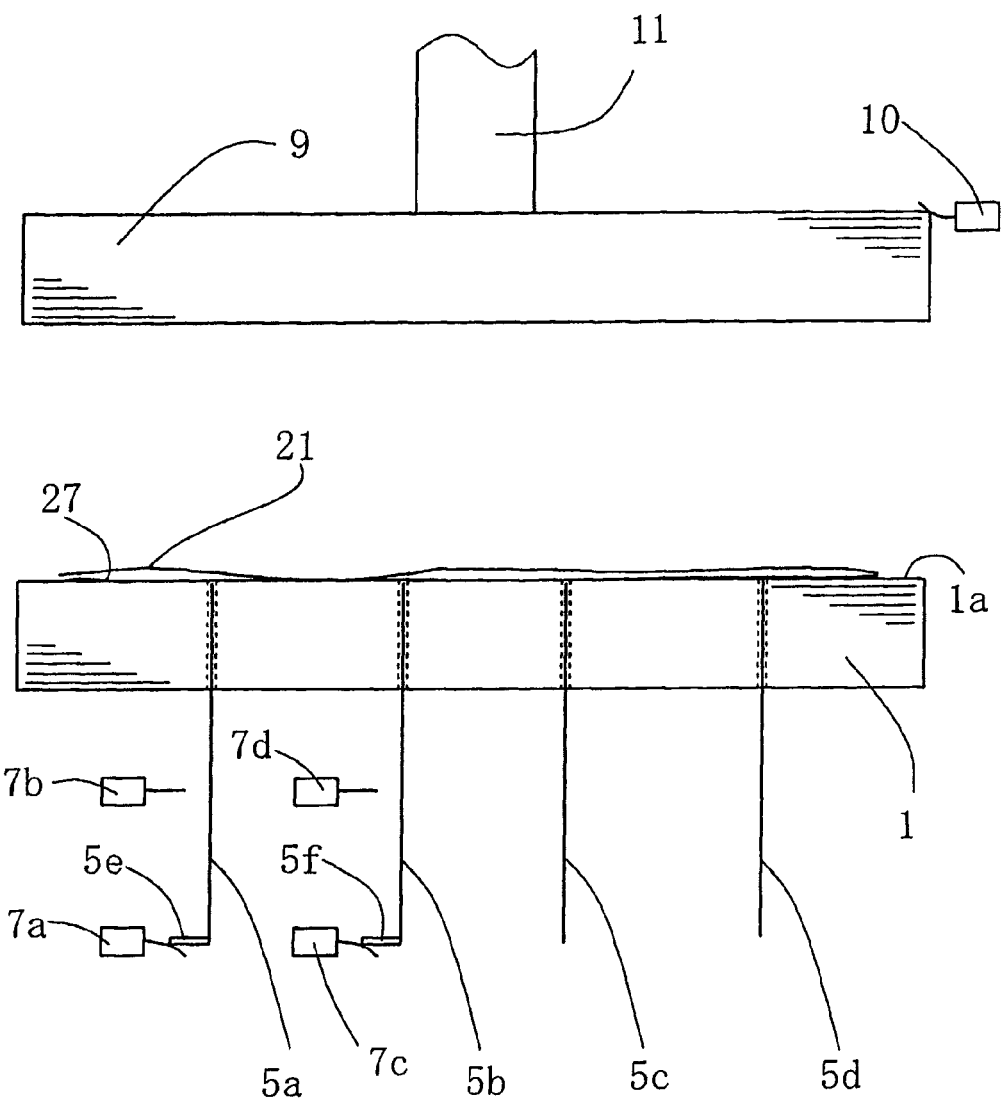

In response to detection signal from the limit switch 19a, the control unit 39 activates the rack-and-pinion drives A and B for downward movement of the support plates 5a, 5b, 5c, 5d. The support plates 5a, 5d are lowered until the limit switch 7a is actuated by the support plate 5a and the support plates 5b, 5c are also lowered until the limit switch 7c is actuated by the projection 5f of the support plate 5b, respectively. As a result, the support plates 5a, 5b, 5c, 5d are positioned with the top ends thereof located slightly below the top surface 1a of the stationary lower heated plate 1 and, therefore, the combined veneer sheets 21, 27 are placed on the top surface 1a of the lower heated plate 1, as shown in FIG. 9.

In response to detection signals from the limit switches 7a, 7c, the control unit 39 generates a command signal to activate the hydraulic cylinder (not shown) for extending its piston rod 11 thereby to move the upper heated plate 9 downward until the veneer sheets 21, 27 are pressed between the two heated plates 1, 9, as shown in FIG. 10. When the pressure being applied to the veneer sheets 21, 27 reaches a predetermined level or 8 kg/cm$^2$ in the present embodiment, downward movement of the heated plate 9 is stopped and the pressure is maintained for a predetermined length of time for hot pressing, e.g. for two minutes. During this hot pressing, veneer sheets 21, 22 receive heat from the plates 1, 9 while being pressed thereby, with the result that the adhesive is cured and the veneer sheets 21, 22 are bonded securely. As will be apparent to those skilled in the art, the pressing time, pressure, temperature of the upper and lower heated plates 9, 1 may be determined as required depending on various factors such as the thickness of veneer sheet, type of adhesive for use, etc.

Figure 11:
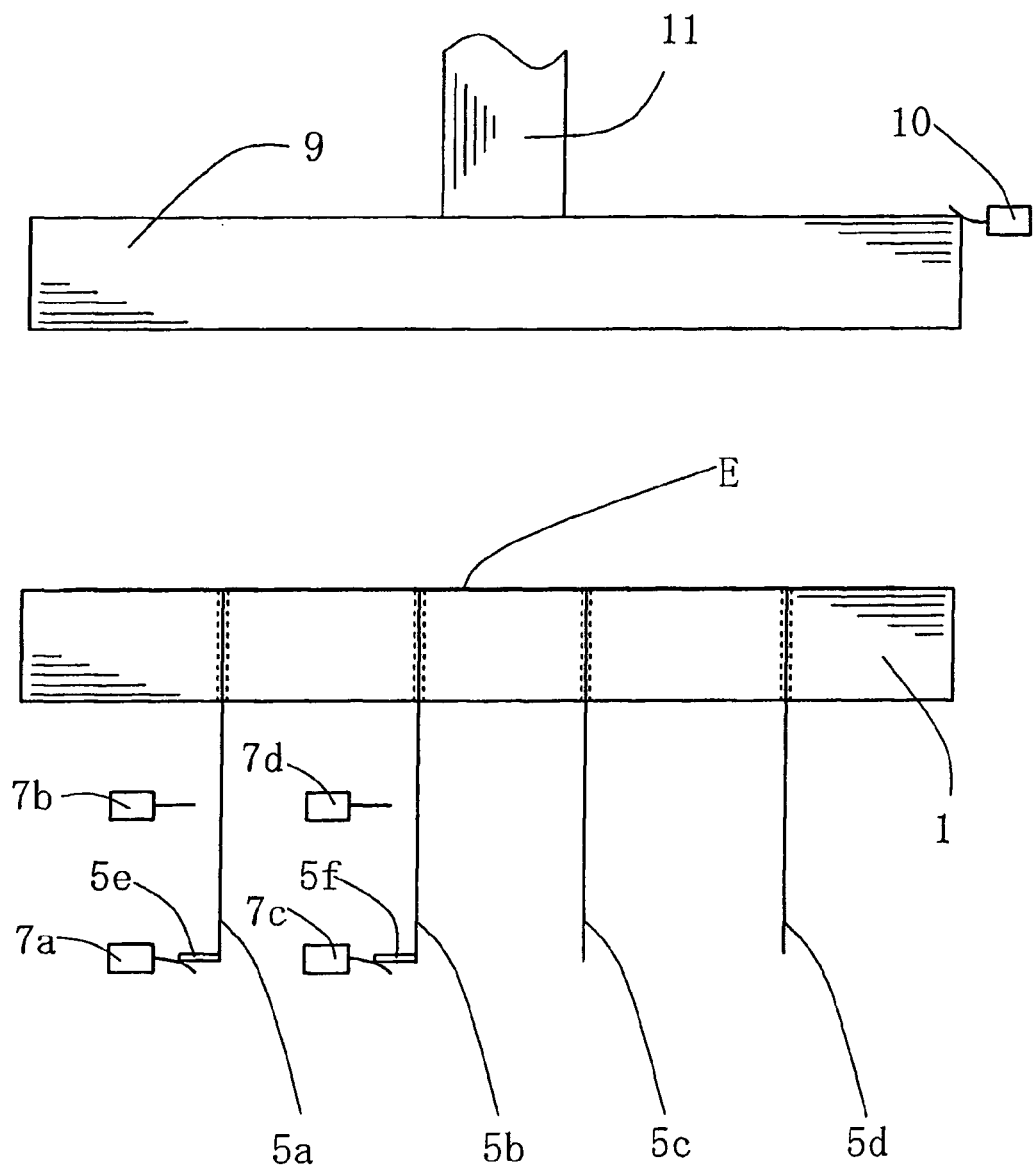

After elapse of the two minutes, the control unit 39 provides a signal to cause the piston rod 11 of the hydraulic cylinder to be retracted until the upper heated plate 9 strikes the limit switch 10, so that the plate 9 is elevated to its original standby position with the bonded veneer sheets 21, 27 remained on the lower heated plate 1, as shown in FIG. 11. This bonded veneer sheets is used as base material for manufacturing a glued laminated board and will be referred to as the first base material E. As will be appreciated from the description that follows, the base material E is a relatively thin sheet composed of only two veneer sheets, but it will become thicker into the form of a board as veneer sheets are bonded successively on opposite surfaces of a progressively thickening base material.

The control unit 39 responding to detection signal from the limit switch 10 which is then actuated by the upper heated plate 9 energizes the rack-and-pinion drives A and B for elevating the support plates 5a, 5b, 5c, 5d until the limit switches 7b, 7d are struck by the projections 5e, 5f of the moving support plates 5a, 5b as described earlier with reference to FIG. 6. As a result, the base material E is elevated, as shown in FIG. 12.

Subsequently, the control unit 39 then responding to detection signals from the limit switches 7b, 7d causes the support bar actuator 35 to advance until the limit switch 37b is struck by the projection 35a of the actuator 35, so that the support bars 33a, 33b are moved to their advanced position between the upper and lower heated plates 9, 1, as shown in FIGS. 12 and 13. As shown in FIG. 12, the support bars 33a, 33b are placed with the top surfaces thereof located below the top ends of the support plates 5a, 5b, 5c, 5d and hence below the base material E.

Figure 14:
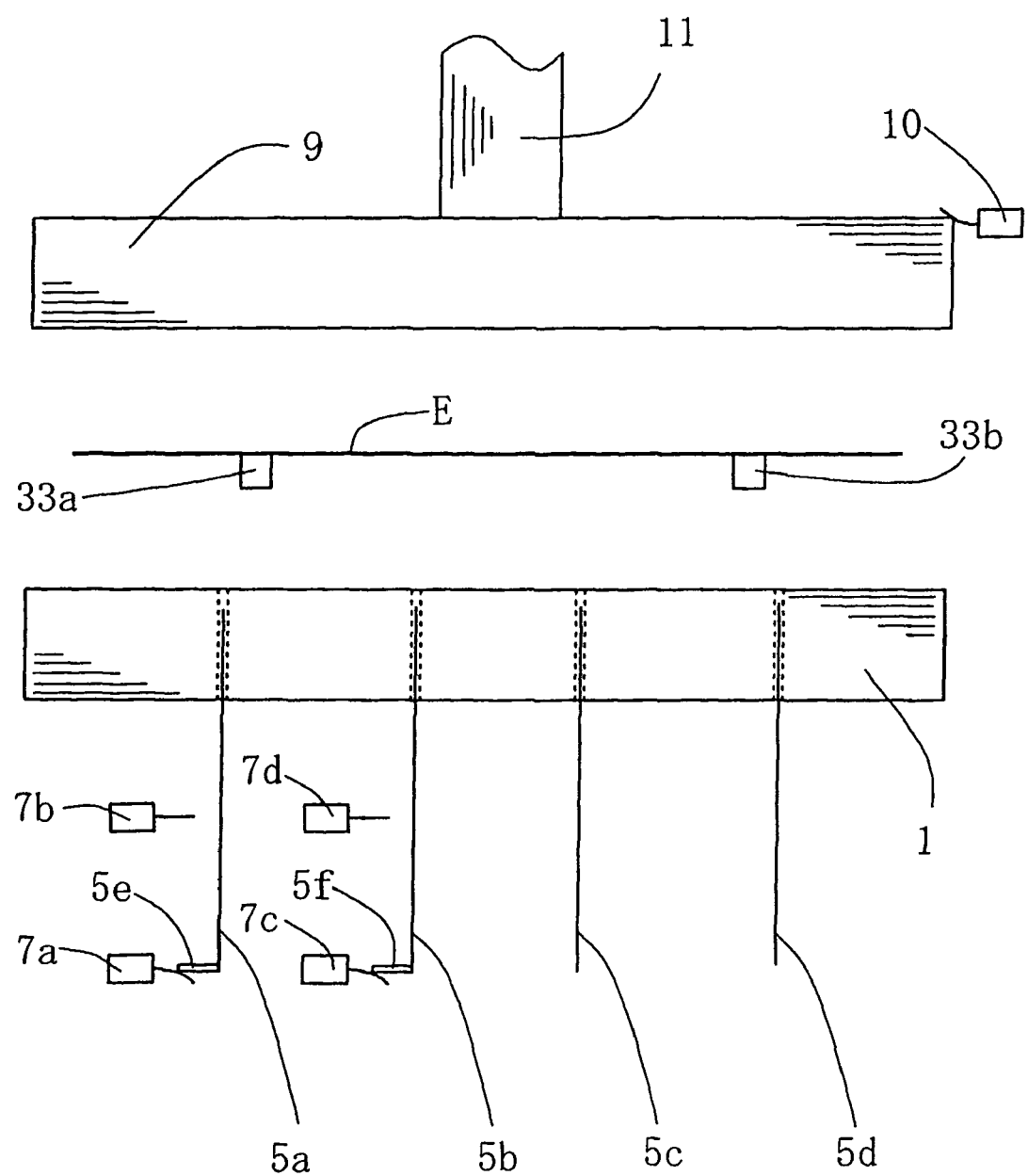

After elapse of a short period of time, e.g. about 0.5 second, that is necessary for the support bars 33a, 33b to be stopped completely after receipt of the detection signal from the limit switch 37b, the control unit 39 generates a command signal to energize the rack-and-pinion devices A and B so as to lower the support plates 5a, 5b, 5c, 5d until the limit switches 7a, 7c are actuated by the bottoms 5e, 5f of the support plates 5a, 5b, respectively. As a result, the support plates 5a, 5b, 5c, 5d are placed in their lowered position and the first base material E is then supported in horizontal position by the support bars 33a, 33b, as shown in FIG. 14.

Figure 15:
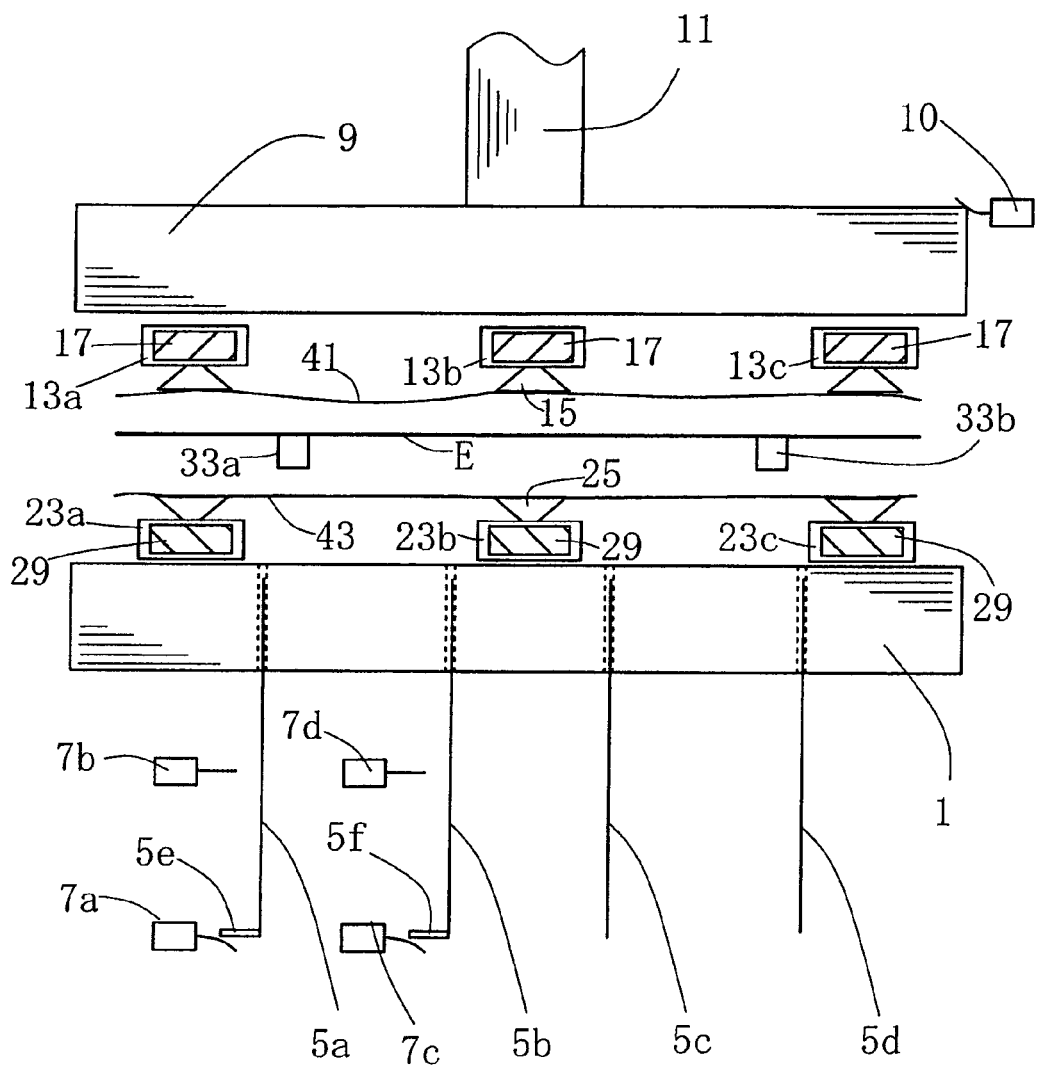

After receiving both detection signals from the limit switches 7a, 7c, the control unit 39 provides command signals, according to which the first actuators 17 are activated so as to move forward the first veneer feeders 13a, 13b, 13c having a veneer sheet 41 held by the suction pads 15 thereof until the limit switch 19b is struck by the projection 17a, thus detecting the arrival of the first veneer feeders 13a, 13b, 13c at the first position thereof, and simultaneously the second actuators 29 are also activated so as to move forward the second veneer feeders 23a, 23b, 23c having a veneer sheet 43 held by the suction pads 15 thereof until the limit switch 31b is struck by the projection 29a, thus detecting the arrival of the second veneer feeders 23a, 23b, 23c at the advanced position thereof. As a result of such movements, the veneer sheet 41 is placed immediately above and in directly facing relation to the upper surface of the base material E and the other veneer sheet 43 is placed immediately below and in directly facing relation to the lower surface of the base material E, as shown in FIG. 15.

Responding to both detection signals from the limit switches 19b, 31b, the control unit 39 closes the valve for the second veneer feeder 23a, 23b, 23c thereby to deactivate their suction pads 15 and then energizes the rack-and-pinion drive A to elevate the support plates 5b, 5c until the projection 5f of the support plate 5b strikes the limit switch 7d, so that the veneer sheet 43 released from the holding by vacuum of suction pads 15 is lifted by the inner support plates 5b, 5c while being supported at the longitudinally central portion by the same support plates 5b, 5c. The lifting of the veneer sheet 43 is continued until the central portion of the veneer sheet 43 is firstly brought into contact with part of the lower surface of the first base material E and the base material E is lifted by the support plates 5b, 5c via the veneer sheet 43 away from the support bars 33a, 33b, as shown in FIG. 16.

The control unit 39 which has received detection signal from the limit switch 7d struck by the projection 5f provides a command signal to move the second actuators 29 until the limit switch 31a is actuated by the projection 29a so that the veneer feeders 23a, 23b, 23c are retracted to their standby position. Simultaneously, control unit 39 causes the support bar actuator 35 to move backward until the support bars 33a, 33b reach their retracted position. A further command signal is generated by the control unit 39 which lowers the first actuators 17 until the limit switch 19c is struck, so that the first veneer feeders 13a, 13b, 13c are moved to their second position and the veneer sheet 41 held by the feeders 13a, 13b, 13c is placed in contact with or close to upper surface of the first base material E, as shown in FIG. 17. It is noted that the veneer support bars 71 shown in FIG. 17 and having a cross-section that is different from that of the support bars 33a, 33b shown in FIG. 16 are provided for the sake of explanation which will be made in a later part hereof.

Figure 16:
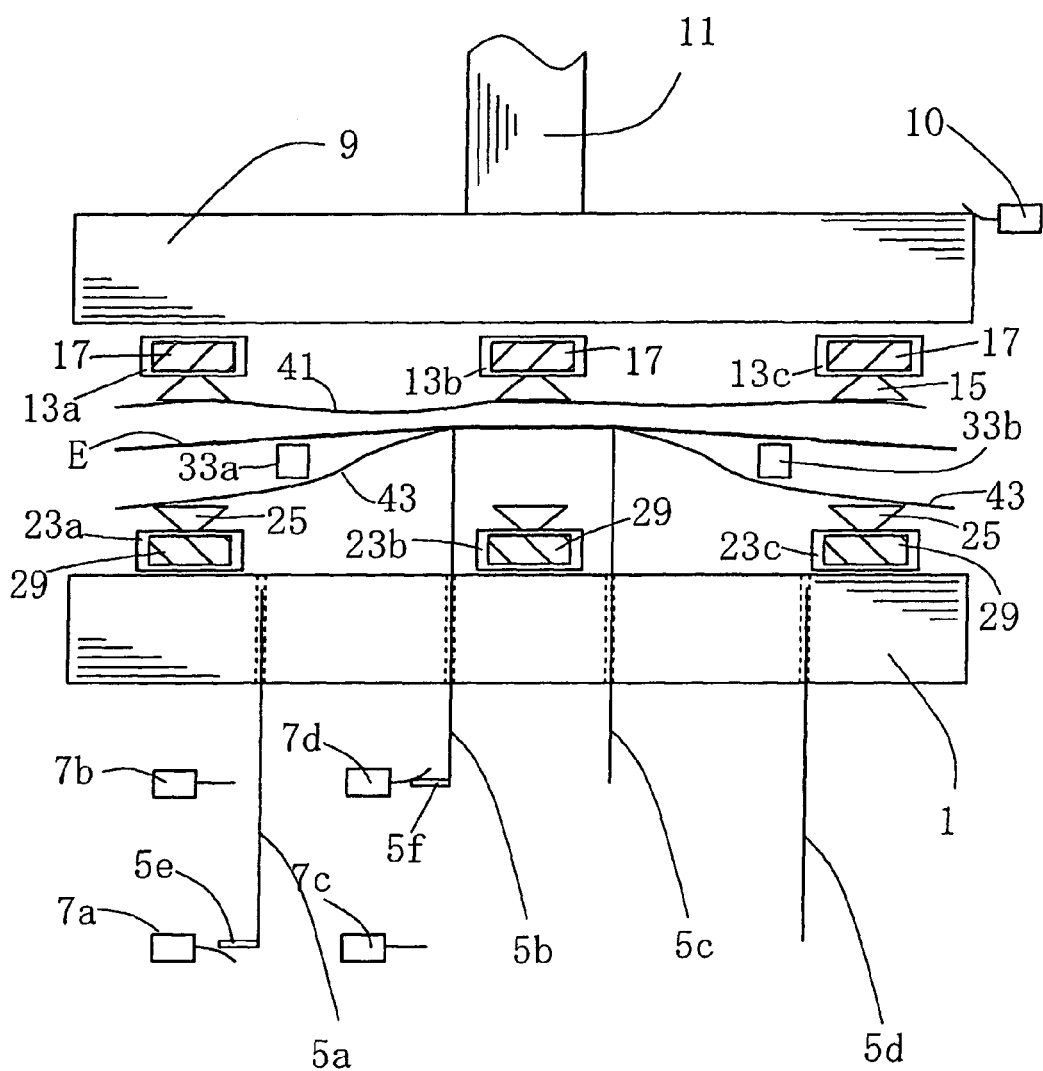
Figure 17:
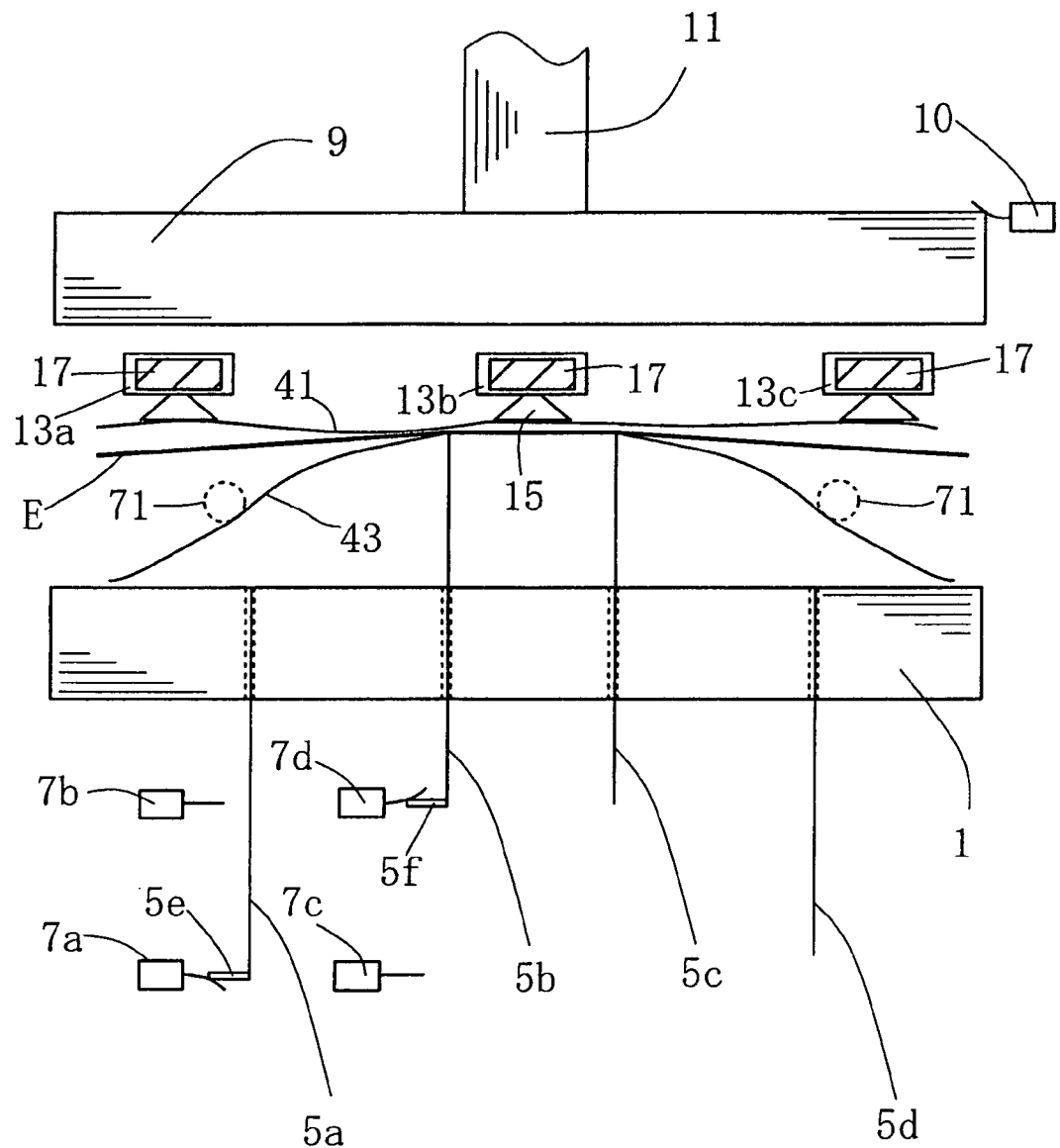

Referring to FIG. 16 or FIG. 17 showing the positional relation of the veneer sheets 41, 43 and the first base material E, the former veneer sheet 43 is supported at its longitudinally central portion by the support plates 5b, 5c and the opposite longitudinal ends portions droop or hang downward. The first base material E, which is made of two veneer sheets 21, 27 bonded together by adhesive, is much less flexible than a single veneer sheet. Though it is supported in the same manner as the veneer sheet 43, the base material E droops only slightly.

Figure 18:
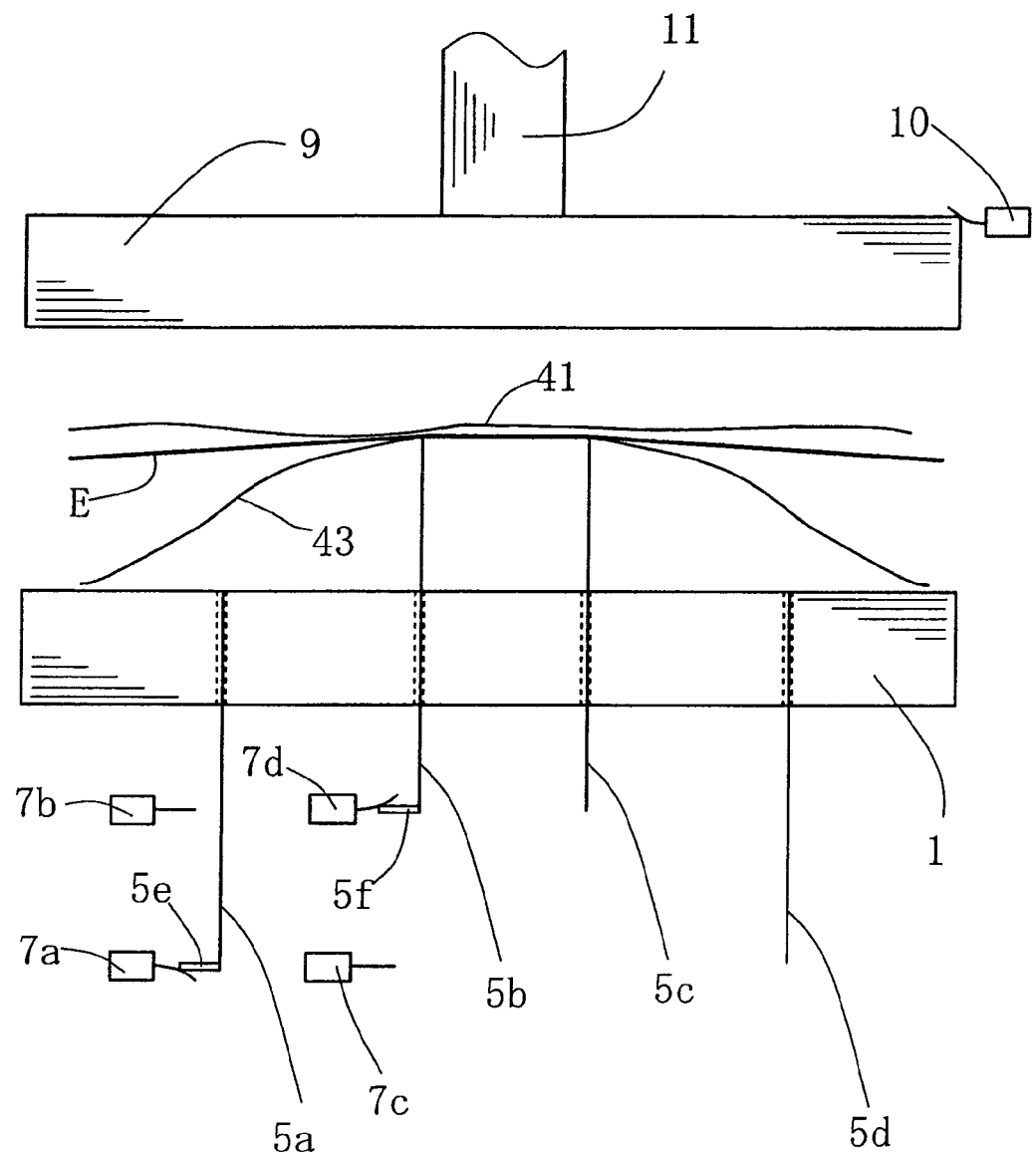

After the limit switch 19c is actuated by the first actuator 17, the control unit 39 closes the valve for the first veneer feeder 13a, 13b, 13c thereby to deactivate their suction pads 15. As a result, the veneer sheet 41 is released from the suction pads 15 and dropped by its own weight to be superposed over the upper surface of first base material E, as shown in FIG. 18.

It is noted that the veneer sheet 41 held by the first veneer feeders 13a, 13b, 13c, as shown in FIG. 17 may be laid over the upper surface of the first base material E at any time after the base material E has been supported by the support bars 33a, 33b, as shown in FIG. 14, and before the support plates 5b, 5c start to be lowered from the position of FIG. 18, as will be described later.

After elapse of a time that is long enough for the veneer sheet 41 to be laid over the upper surface of the first base material E (e.g. about one second) since the above actuation of the limit switch 19c, the control unit 39 generates a command signal to move the first actuators 17 upward until the limit switch 19b is actuated, so that the first veneer feeders 13a, 13b, 13c are moved from the second position to the first position thereof. Simultaneously, another command signal is provided which causes the same first actuators 17 to move backward until the limit switch 19a is struck by the projection 17a, so that the first veneer feeders 13a, 13b, 13c are moved back to their retracted standby position. As a result, the veneer sheets 41, 43 and the first base material are supported only by the support plates 5b, 5c, as shown in FIG. 18.

After the first veneer feeders 13a, 13b, 13c have been moved back to their standby position, the control unit 39 activates the rack-and-pinion drives A thereby to lower the support plates 5b, 5c until the limit switch 7c is struck by the projection 5f at their original lowered position. In this position of the support plates 5b, 5c, the veneer sheets 41, 43 and the first base material E are placed together on the top surface 1a of the lower heated plate 1, as shown in FIG. 19. As seen from FIGS. 18 and 19, the veneer sheet 43 is laid substantially over the entire lower surface of the base material E and the veneer sheet 41 is superposed or laid substantially over the entire upper surface of the base material E, respectively.

Figure 20:
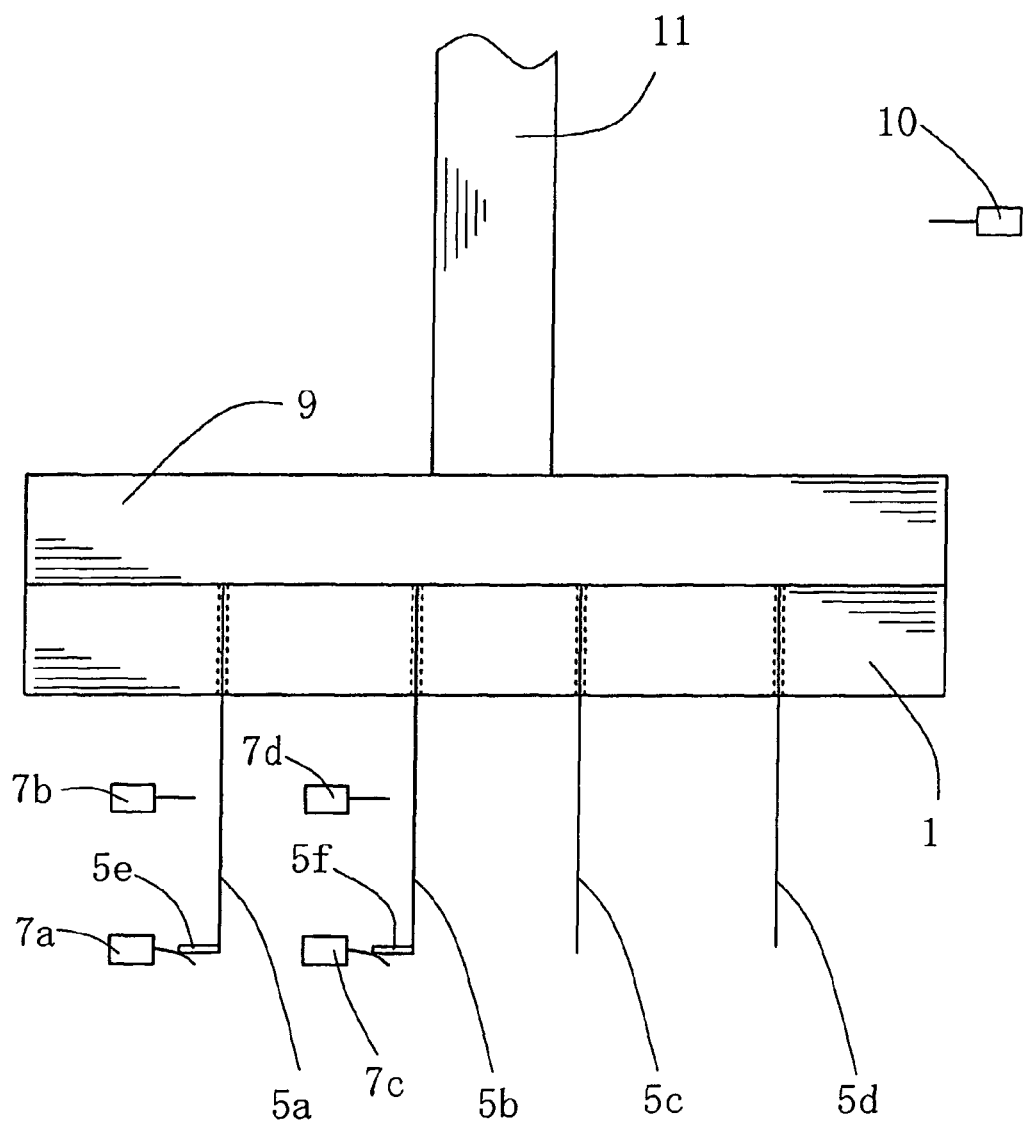

Then, the control unit 39 provides a command signal to operate the cylinder so as to extend the piston rod 11 for hot pressing the veneer sheets 41, 43 and the first base material E by the upper and lower heated plates 9, 1, as shown in FIG. 20, under the aforementioned pressure for a predetermined length of time, e.g. about one minute.

After one minute of hot pressing, the hydraulic cylinder is operated to retract its piston rod 11 until the limit switch 10 is actuated by the elevating upper heated plate 9. Thus, the upper heated plate 9 is placed in its elevated standby position and the stationary lower heated plate 1 has on the top surface thereof the veneer sheets 41, the first base material and the veneer sheet 43 which are bonded together by adhesive into a second base material F, as shown in FIG. 21. Obviously, the second base material F is composed of four veneer sheets.

After this second base material F has been made, a series of steps of operation similar to those which have been done in laying and bonding veneer sheets 41, 43 over the upper and lower surfaces of the first base material E as described with reference to FIGS. 12 through 21 is performed for laying and bonding new two veneer sheets over the upper and lower surfaces of the second base material F for making a third base material consisting of six veneer sheets. Such series of similar steps of operation are repeated for each newly made base material F, C, H and so forth until a glued laminated board with the desired thickness is made.

It is noted that the last two veneer sheets to be bonded over the opposite surfaces of a base material immediately before the final product of glued laminated board is made should be pressed to the base material longer than one minute, e.g. for about two minutes.

In the above-described preferred embodiment, veneer sheets such as 41, 43 are pressed to the base material for about one minute while the first two veneer sheets 21, 27 and the last two veneer sheets are pressed for about two minutes for the following reason.

For successful bonding of the first two veneer sheets 21, 27, they should be pressed by the heated plates 1, 9 for a period of time that is long enough for sufficient heat to be transmitted to the adhesive layer between the veneer sheets 21, 27 for curing of the adhesive. After hot pressing, the outer surfaces of the veneer sheets 21, 27 bonded together into the first base material E have been already heated and hence very high in temperature, so that the adhesive coatings of the next veneer sheets 41, 43 laid over such heated surfaces receive heat from the base material E, 27, as well as from the heated plates 1, 9 of the press. Therefore, the amount of heat to be transmitted to the adhesive coatings of veneer sheets from the heated plates 9, 1 may be lessened in the second and the subsequent pressing operation by reducing the length of pressing time, e.g. one minute against two minutes. Curing of the adhesive coating continues even after this one minute of pressing. Because one-minute pressing is done successively in to the above-described embodiment, the adhesive coating layer receives heat during the subsequent pressing of new veneer sheets for lamination to the opposite surfaces of a base material.

Because the pressing of the last pair of veneer sheets is followed by no hot pressing, the length of the last pressing which is done under the same pressure should be lengthened to, e.g., two minutes for achieving substantially the same bonding results.

The following will describe modifications or changes of the apparatus for practicing the method of the present invention, as well as some considerations in practicing the method.

In the above-described preferred embodiment, veneer sheets and a base material are hot pressed by the upper and lower heated plates 9, 1, as shown in FIG. 20. However, hot pressing may be done by any suitable hot press which is provided separately from the apparatus. In such case, for example, the veneer sheets 41, 43 and the first base material E arranged as shown in FIG. 18 are taken away from the apparatus by manual operation or using any suitable device and set in a separate press for hot pressing. The apparatus can dispenses with the upper and lower heated plates 9, 1 and is used for laying two veneer sheets over the upper and lower surfaces of a base material.

In lifting a veneer sheet, e.g. 43, by raising the support plates 5b, 5c from the standby position of FIG. 15 to the elevated position of FIG. 16, the opposite longitudinal end portions of the veneer sheet 43 may droop to a less extent depending on the species of the veneer sheet, so that it may hit or interfere with the support bars 33a, 33b. When the support bars 33a, 33b are being moved back to their retracted position, the veneer sheet 43 then in contact with the moving support bars 33a, 33b may be displaced from its normal position.

To prevent the veneer sheet from such displacement due to contact with the support bars 33a, 33b, a pair of pressing bars 71 each having a circular cross section, as shown in FIG. 17, and a length corresponding to the width of the veneer sheet may be used. To be more specific, the pressing bars 71 are normally placed in their retracted position away from the pressing area between the upper and lower heated plates 9, 1. In the state of the apparatus shown in FIG. 17 when the support plates 5b, 5c are moved to their elevated position to support the veneer sheet 43 and the base material together, the pressing bars 71 are moved axially into the hot press 1, 9 at a height that is below the base material E and above the drooping longitudinal end portions of the veneer sheet 43 and then lowered so as to bend the opposite longitudinal end portions of the veneer sheet 43 downward, as shown in FIG. 17. By so doing, the contact of the veneer sheet 43 with support bars 33a, 33b being moved back to their retracted position can be forestalled.

Figure 22:
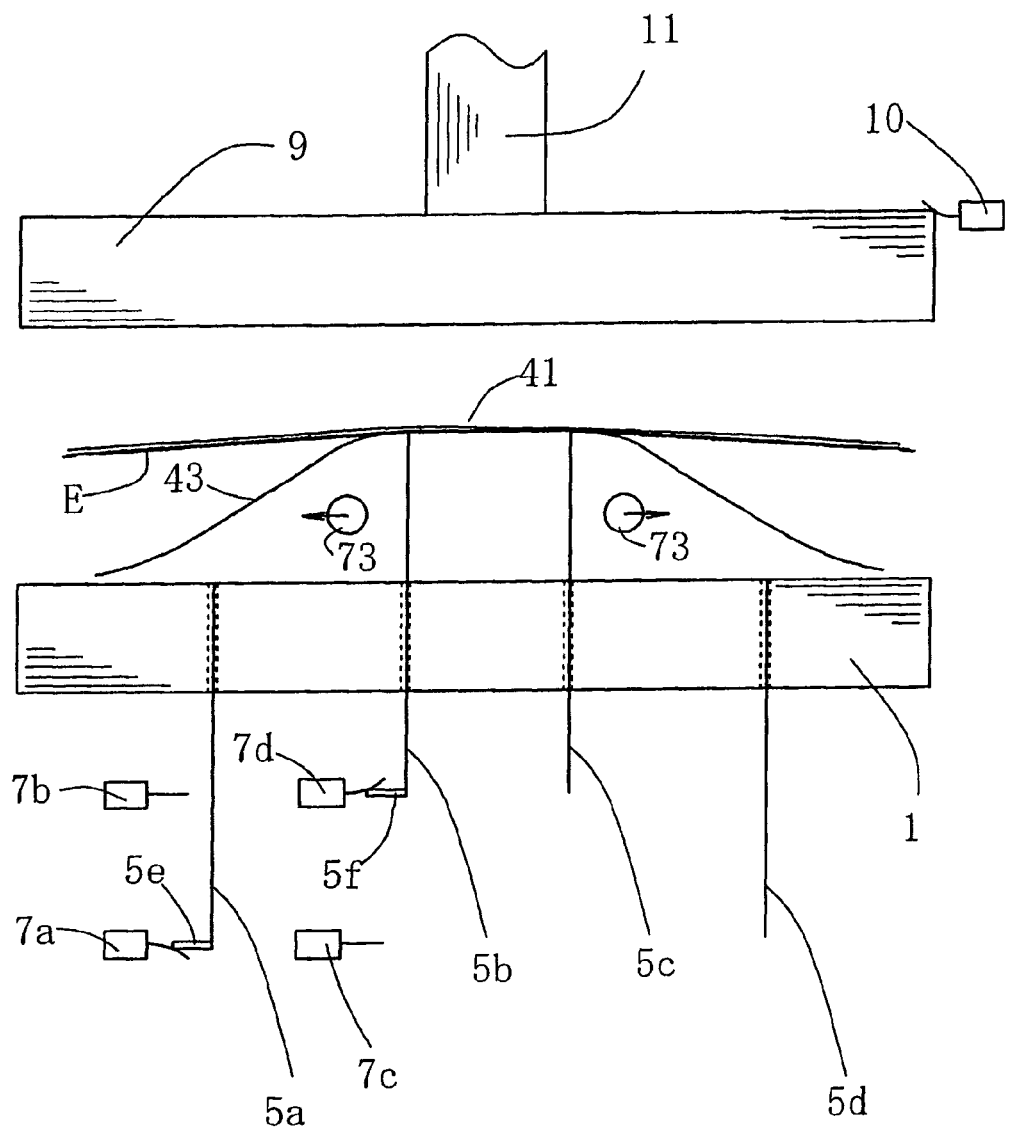

Depending on the species, a veneer sheet, e.g. 43, may droop to a greater extent when it is lifted by the support plates 5b, 5c, as shown in FIG. 22. When the support plates 5b, 5c are lowered from the position of FIG. 22, the longitudinal ends of the veneer sheet 43 are brought into contact with and then held by the upper surface of the lower heated plate 1 due to the frictional force therebetween, with the result that the veneer sheet 43 fails to be laid flat on the lower heated plate flat 1.

Figure 23:
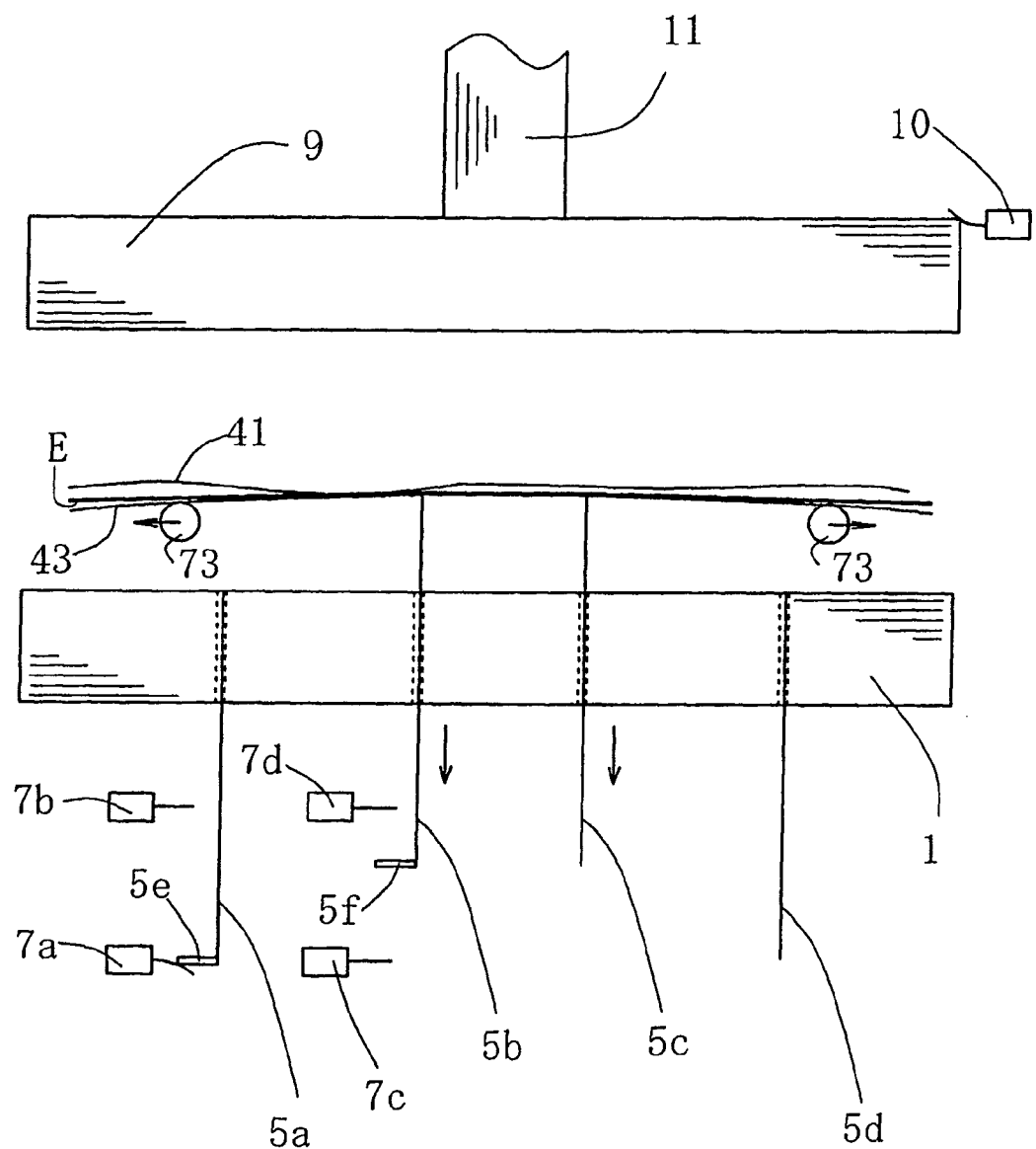

To prevent such a trouble, a pair of lifting bars 73 similar to the pressing bars 71 of FIG. 17 may added to the apparatus, as shown in FIG. 22. These lifting bars 73 are normally placed in their retracted position away from the pressing area between the upper and lower heated plates 9, 1. In the state of the apparatus of FIG. 17, the lifting bars 73 are moved axially into the operative position thereof between the heated plates at a height that is below the veneer sheet 43, as shown in FIG. 22, and then moved horizontally away from each other as indicated by arrows in FIGS. 22 and 23 in conjunction with the lowering movement of the support plates 5b, 5c. As will be appreciated from FIG. 23, the lifting bars 73 lift the longitudinal end portions of the veneer sheet 43 while moving away from each other during the lowering movement of the support plates 5b, 5c, so that the veneer sheet 43 can be laid flat on the upper surface of the lower heated plate 1, as shown in FIG. 19. As a matter of course, the lifting bars 73 are moved out of the hot press 1, 9 before the limit switch 7c is struck by the projection 5f of the support plate 5b.

Although, in the preferred embodiment, a single veneer sheet is laid over each of the upper and lower surfaces of a base material, two or more veneer sheets may be laid over each of the opposite surfaces of the base material for each hot pressing operation. The following will describe the steps of operation in case of laying two veneer sheets on each of the opposite surfaces of the base material E.

Figure 24:
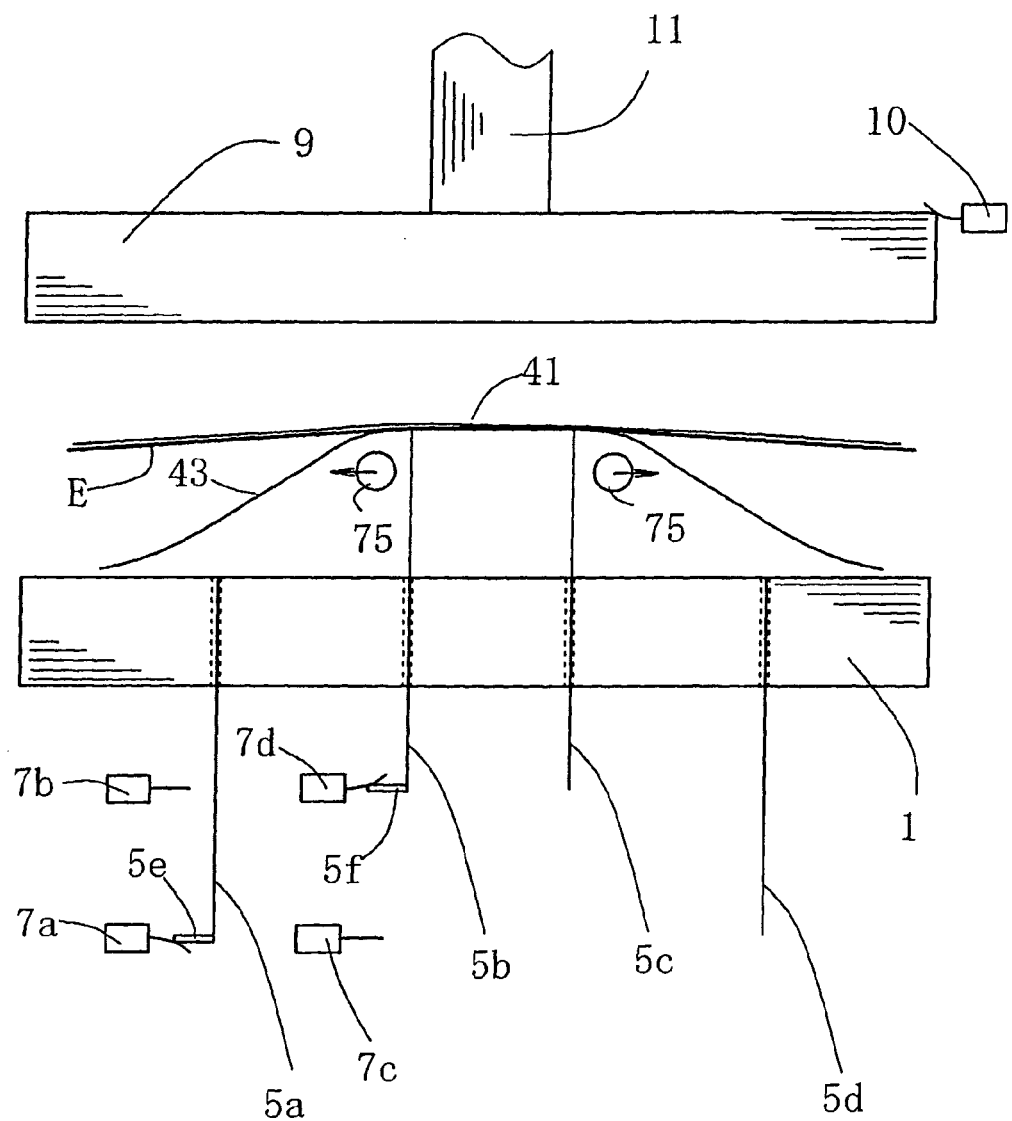
Figure 25:
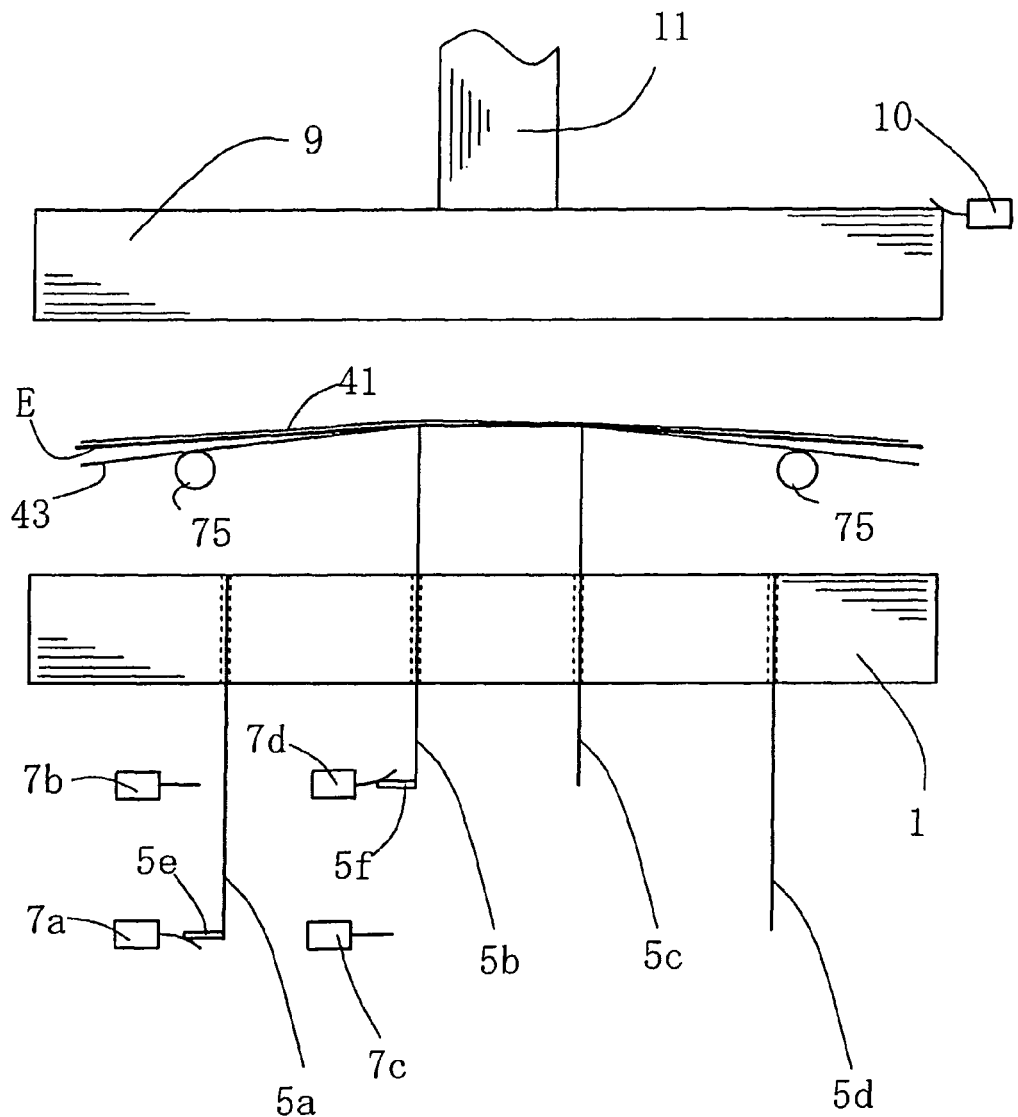
Figure 26:
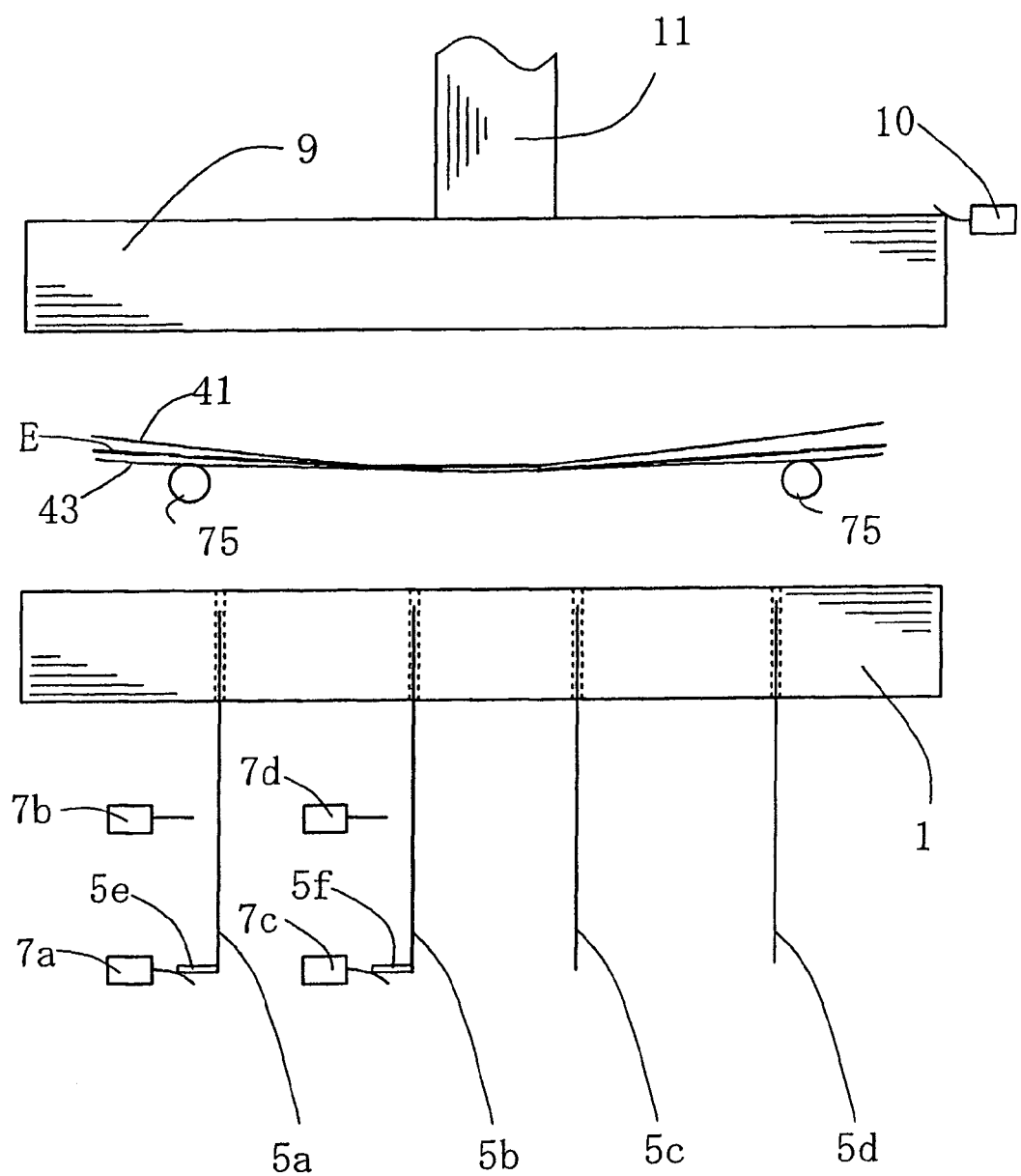

As shown in FIG. 24, a pair of lifting bars 75 similar to the pressing bars 71 of FIG. 17 is used. These lifting bars 75 are normally placed in their retracted position out of the hot press 1, 9. In the state of the apparatus shown in FIG. 18, the lifting bars 75 are moved axially into their operative position between the heated plates 1, 9, as shown in FIG. 24, and then moved horizontally away from each other as indicated by arrows to positions adjacent to the longitudinal ends of the veneer sheet 43, as shown in FIG. 25. Then, the support plates 5b, 5c are lowered until the limit switch 7c is struck by the projection 5f of the plate 5b. As a result, the base material E and the veneer sheets 41, 43 laid over the opposite upper and lower surfaces of the base material E are supported together by the lifting bars 75, as shown in FIG. 26.

Figure 27:
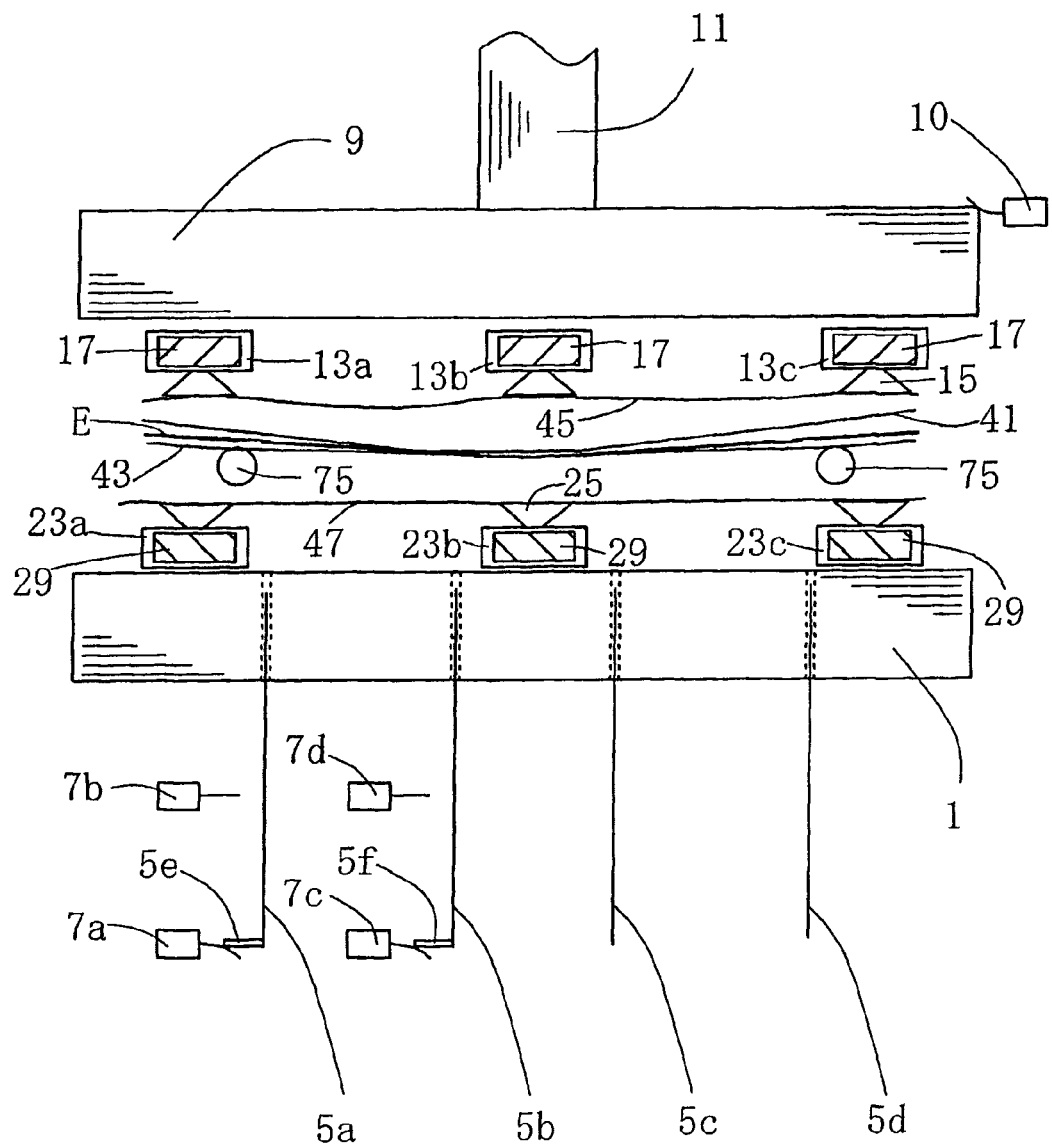

Subsequently, a series of operations similar to those for laying the veneer sheets 41, 43 over the upper and lower surfaces of the base material E is performed. That is, a veneer sheet 45 held by the first veneer feeders 13a, 13b, 13c is placed immediately above the veneer sheet 41 and another veneer sheet 47 held by the second veneer feeders 23a, 23b, 23c is placed immediately below the veneer sheet 43, a shown in FIG. 27.

Figure 28:
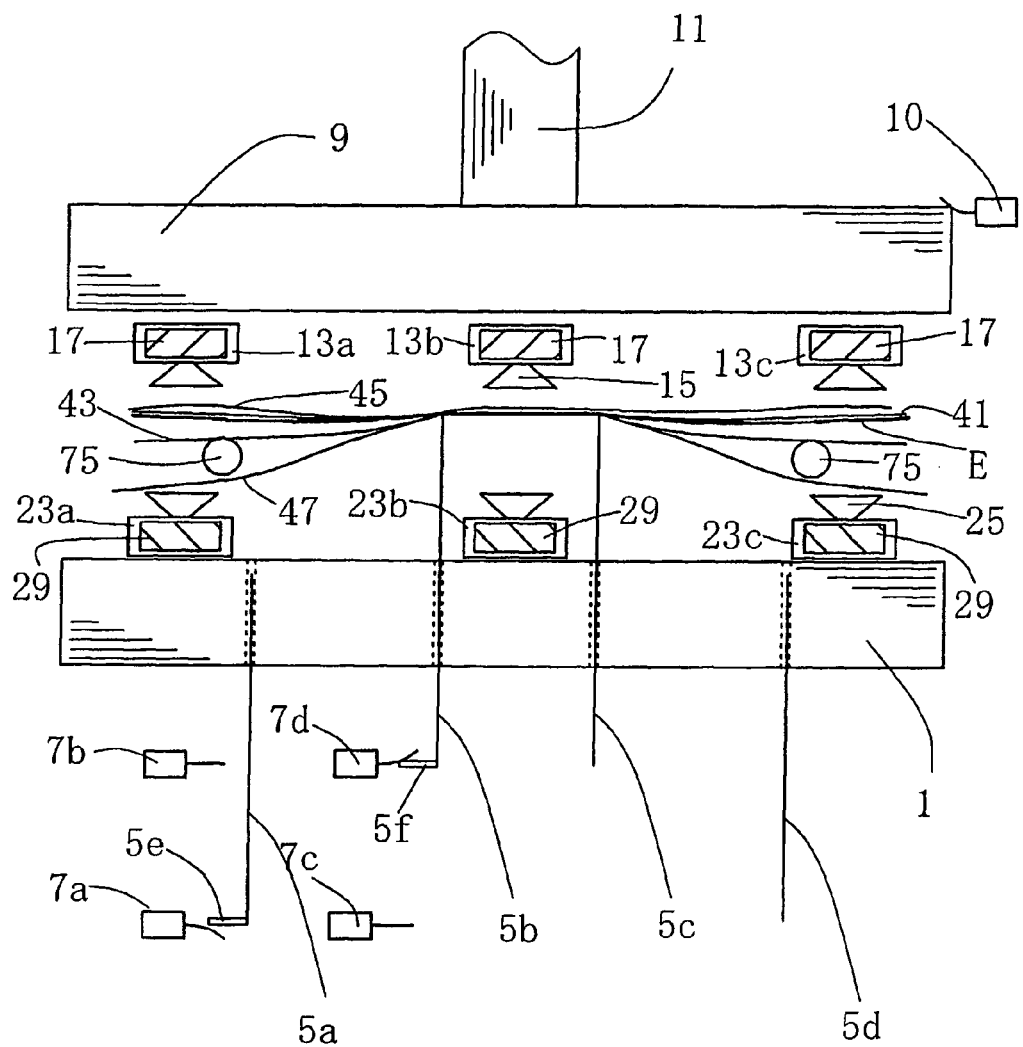
Figure 29:
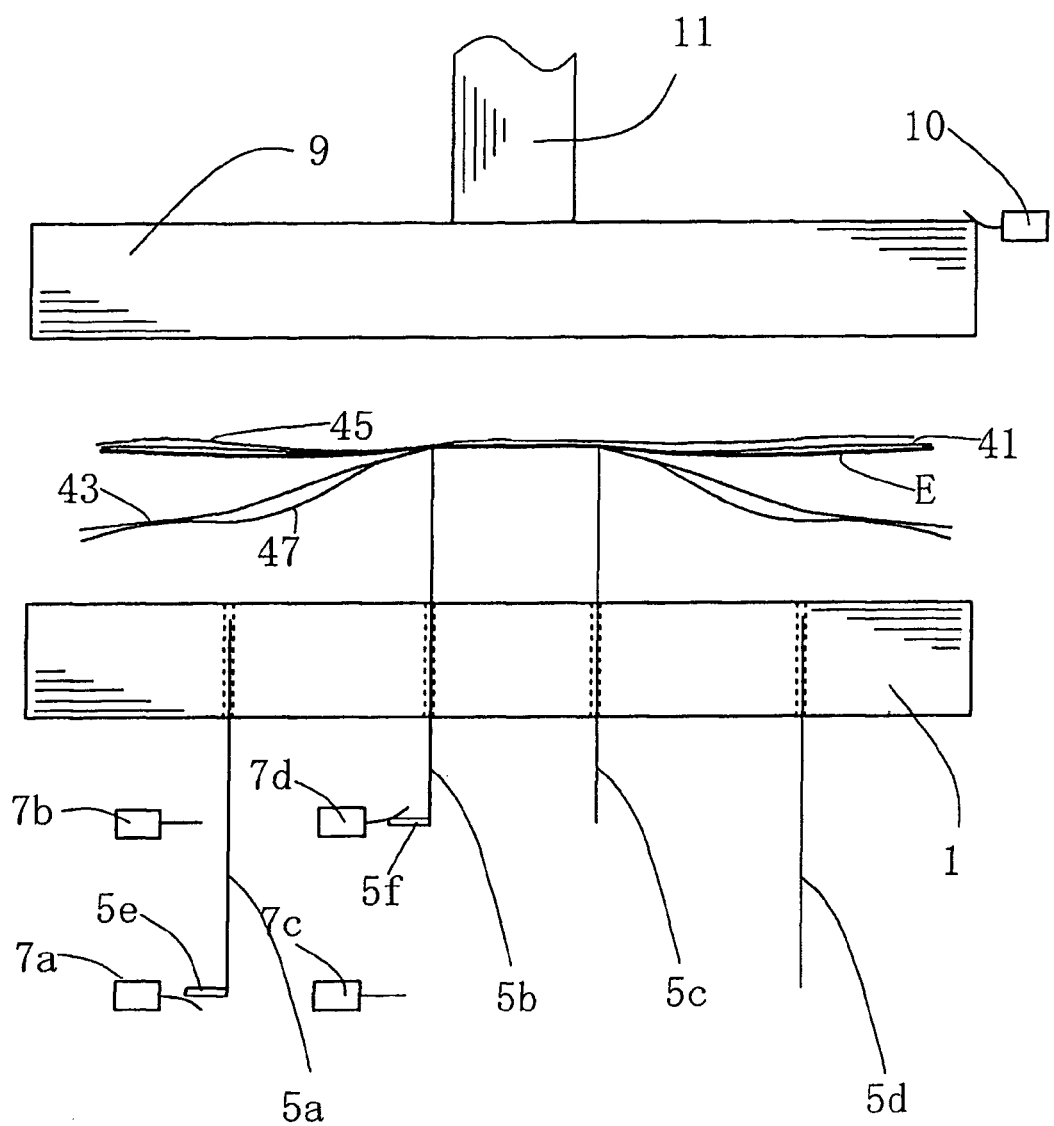

Then, the suction pads 25 of the second veneer feeders 23a, 23b, 23c are deactivated to release the veneer sheet 47 from the second veneer feeders 23a, 23b, 23c and the support plates 5b, 5c are moved upward to lift the veneer sheet 47 until the limit switch 7d is struck by the projection 5f of the support plate 5b. As a result, the veneer sheet 47 is disposed with its mid portion set against the veneer sheet 43, as shown in FIG. 28. The suction pads 15 of the first veneer feeders 13a, 13b, 13c are then deactivated, so that the veneer sheet 45 is released from the first veneer feeders 13a, 13b, 13c and laid over the top surface of the veneer sheet 41, as shown in FIG. 28. The first and second veneer feeders 13a, 13b, 13c, 23a, 23b, 23c are moved back to their standby positions and the lifting bars 75 are also moved to their retracted position outside the hot press 1, 9. FIG. 29 shows the veneer sheets 41, 45, 43, 47 and the first base material E after the first and second veneer feeders 13a, 13b, 13c, 23a, 23b, 23c and the lifting bars 75 have been retracted.

Lowering the support plate 5b, 5c until the projection 7d strikes the limit switch 7c, the veneer sheets 41, 45, 43, 47 and the first base material E are all placed on the top surface 1a of the lower heated plate 1, as shown in FIG. 30. Then, the cylinder for the piston rod 11 is operated to lower the upper heated plate 9 for hot pressing the veneer sheets 41, 45, 43, 47 and the first base material E.

Thus, a six-layer laminated veneer is produced as a new base material. Thereafter, new two veneer sheets are laid over each of the opposite upper and lower surfaces of the six-layer base material for hot pressing by using the same steps of operation as those used for laying the veneer sheets 41, 45, 43, 47 over the upper and lower surfaces of the base material E. A series of such steps of operation is performed repeatedly until the product with the desired thickness is made.

Figure 31:
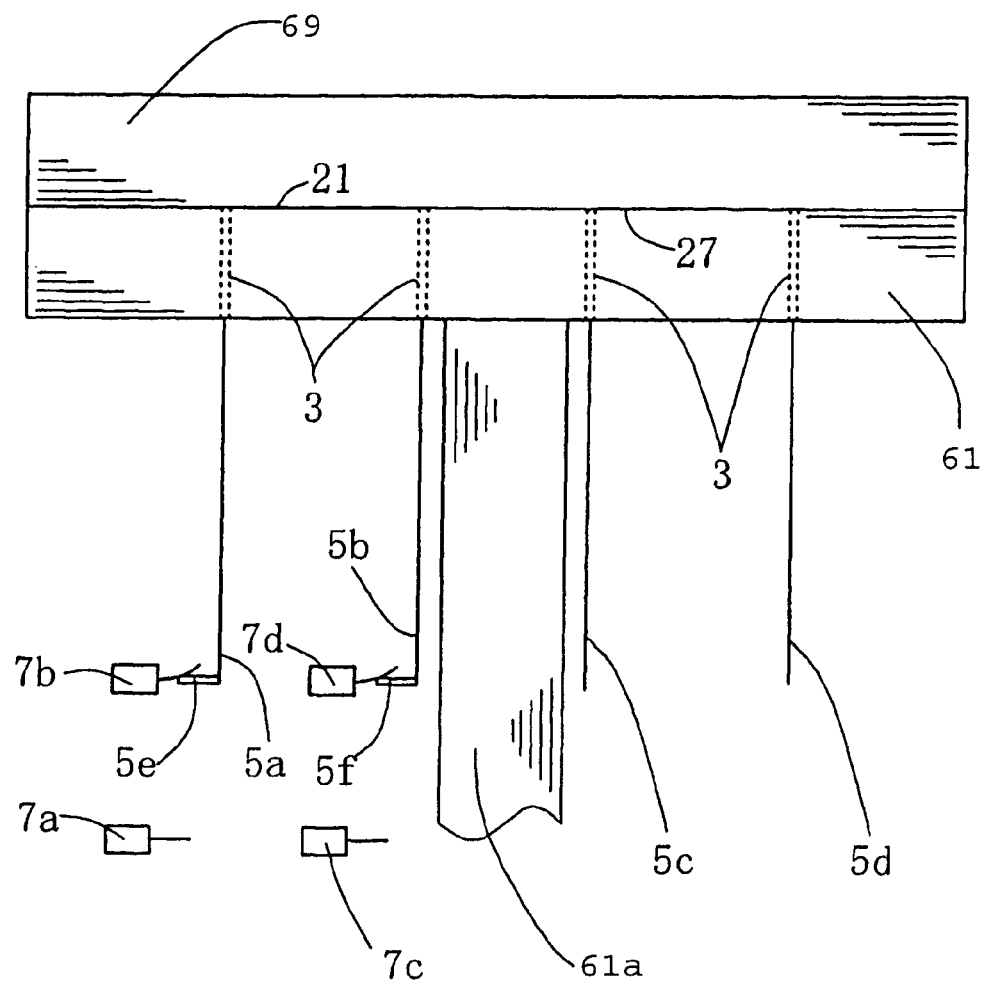

Though the hot press of the preferred embodiment has the stationary lower heated plate 1 and the movable upper heated plate 9, it may be so arranged, as shown in FIG. 31, that the upper plate 69 is stationary and the lower heated plate 61 has a hydraulic cylinder (not shown) and a piston rod 61*a* for moving the lower plate 61 relative to the stationary upper plate 69. In such an arrangement, when veneer sheets, e.g. 21 and 27, are supported by the support plates 5*a*, 5*b*, 5*c*, 5*d* (e.g. as shown in FIG. 8), the lower heated plate 61 is raised thereby to move and press the veneer sheets 21, 27 against the upper heated plate 69 for hot pressing, as shown in FIG. 31. The support plates 5*a*, 5*b*, 5*c*, 5*d* remain unmoved while the lower heated plate 31 is move upward toward the upper heated plate 69, as appreciated from FIG. 31. When the lower heated plate 61 is moved by the hydraulic cylinder to its lowered standby position after an elapse of a predetermined length time for hot pressing, a first base material such as E is made and supported by the support plates 5*a*, 5*b*, 5*c*, 5*d* in such a condition as shown in FIG. 12.

Subsequently, a series of steps of operations including the movement of the support bars 33*a*, 33*b* and laying veneer sheets 41, 43 relative to the upper and lower surfaces of the base material E is performed so that such an arrangement of the veneer sheets 41, 43 and the base material E as shown in FIG. 18 is accomplished. Then, the lower heated plate 1 is raised for hot pressing the veneer sheets 41, 43 to the base material E under the same pressing conditions. A series of such steps of operation is repeated until the product with the desired thickness is made. Obviously, the length of the support plates 5*a*, 5*b*, 5*c*, 5*d* should be determined such that the top ends of the support plates will not come out of the slots 3 when the lower heated plate 61 is moved to its operative pressing position shown in FIG. 31.

In the preferred embodiment, a veneer sheet, e.g. 43, is lifted by the support plates 5*b*, 5*c* into contact with the base material E which is then supported by the support bars 33*a*, 33*b* so that the veneer sheet 43 and the base material are supported together by the plates 5*b*, 5*c*, as shown in FIG. 16. According to the present invention, however, the method may be practiced as follows.

Figure 32:
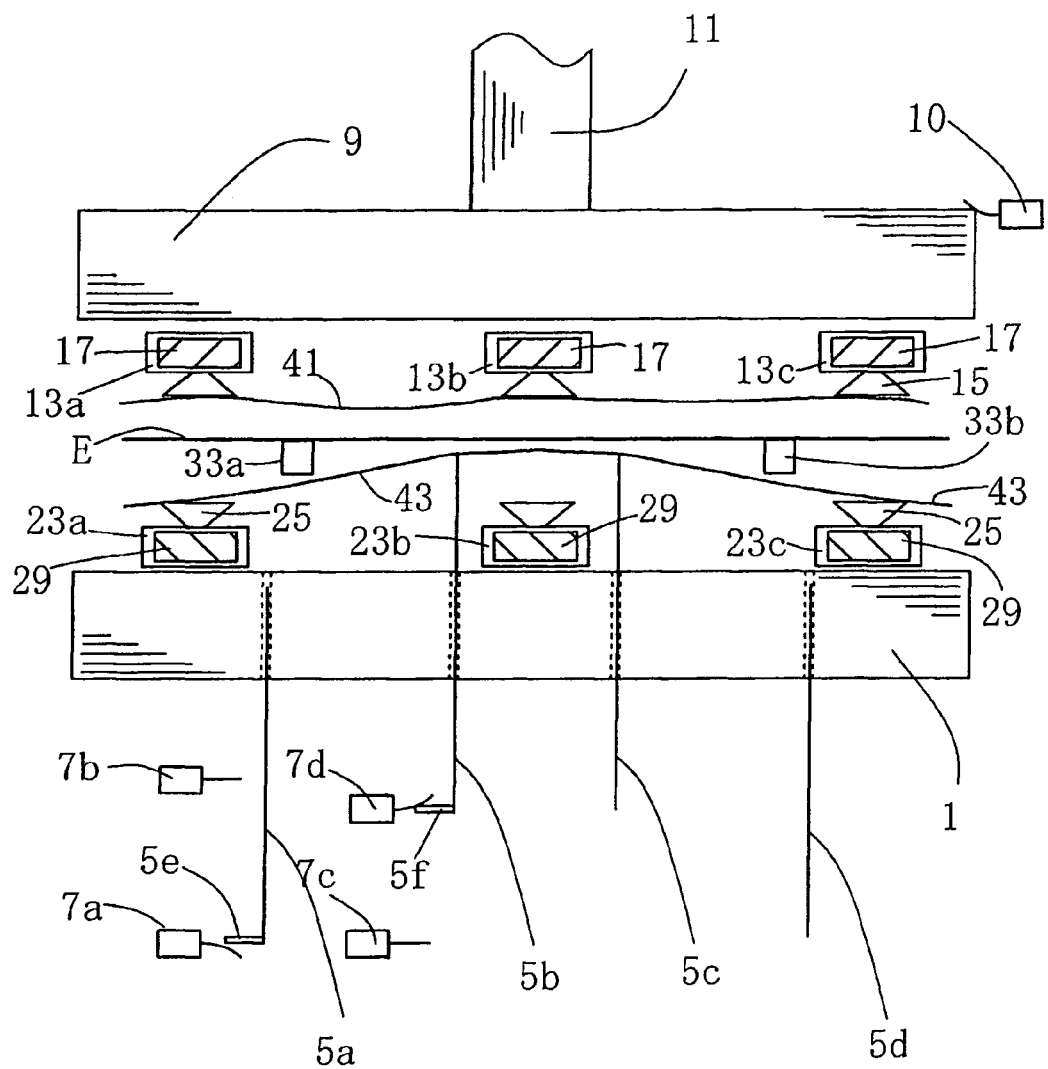
Figure 33:
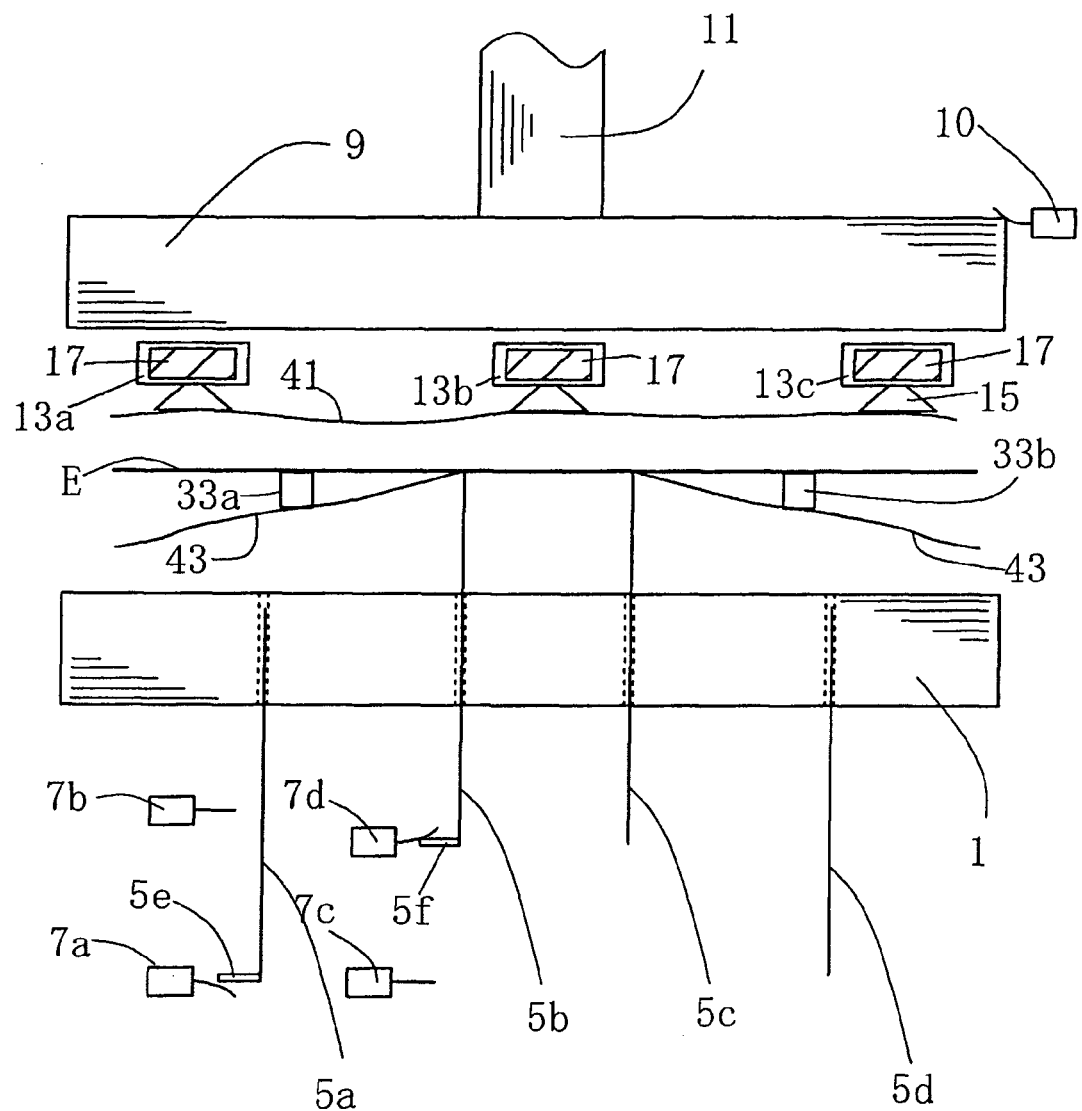

In the state of the apparatus of FIG. 15, the support plates 5*b*, 5*c* are elevated only to a height before the veneer sheet 43 is brought into contact with the base material E, as shown in FIG. 32. Then, the second veneer feeders 23*a*, 23*b*, 23*c* are retracted to their standby position and the support bars 33*a*, 33*b* are lowered by any suitable means (not shown) to such an extent that the base material E is supported by the support plates 5*b*, 5*c* by way of the veneer sheet 43, as shown in FIG. 33. Steps of operation for practicing the method thereafter are substantially the same as in the preferred embodiment. As a matter of course, raising of the support plates 5*b*, 5*c* and lowering of the support bars 33*a*, 33*b* may be performed simultaneously for increasing the productivity.

Two separate support plates 5*b*, 5*c* may be connected together at the top ends thereof by any suitable means such as a thin steel plate. In hot pressing, part of the lower veneer sheet, e.g. 43, will receive heat from the lower heated plate 1 through the connection steel plate.

Figure 34:
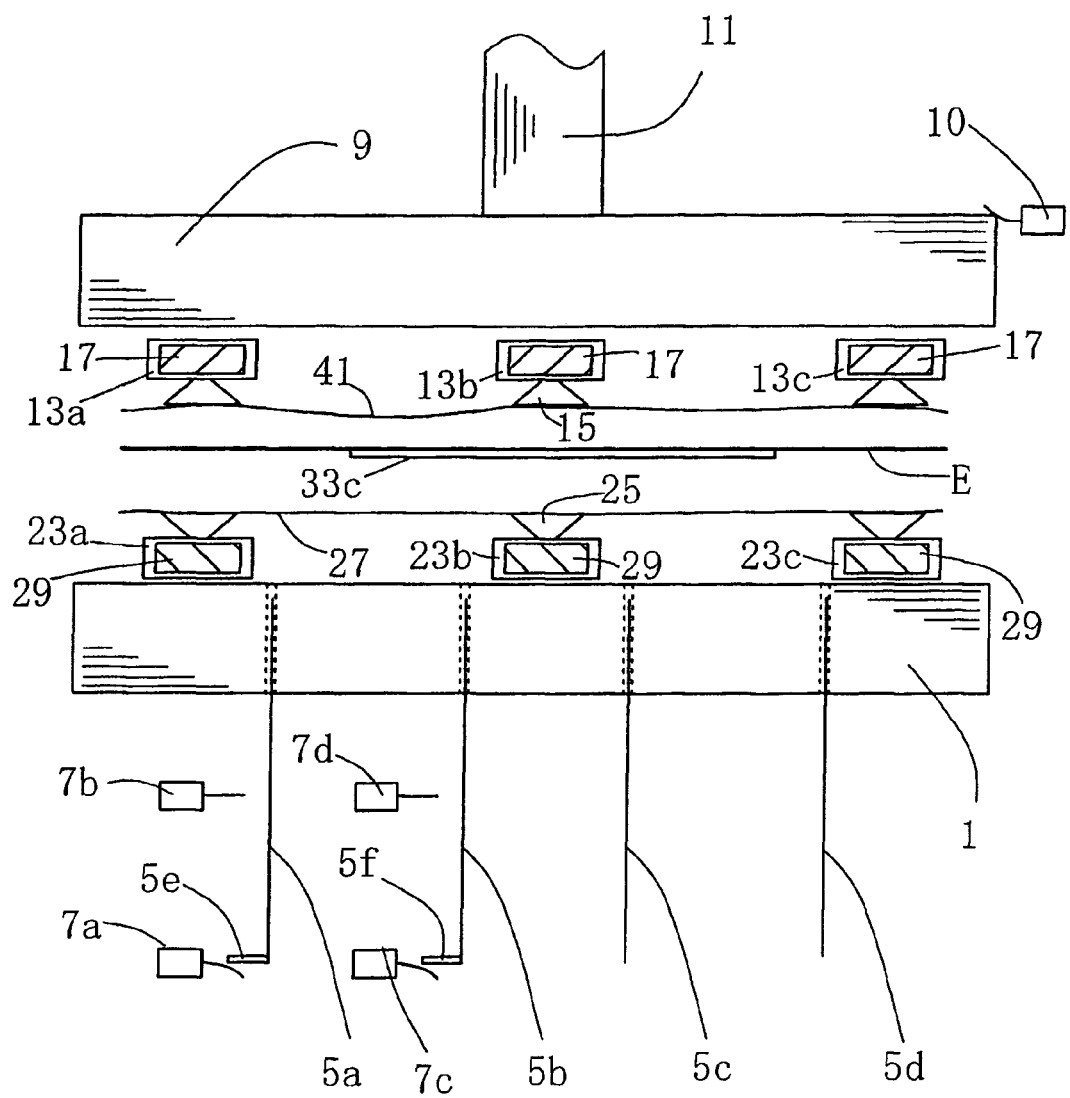

The apparatus of FIG. 34 which corresponds to that of FIG. 15 differs from the apparatus used for practicing the preferred embodiment in that the two support bars 33*a*, 33*b* are substituted by a single support plate 33*c* which is adapted to support a base material, such as E, at its longitudinal middle portion. Like the support bars 33*a*, 33*b*, the support plate 33*c* is reciprocally movable between the retracted standby position out of the hot press 1, 9 and the supporting position within the hot press (FIG. 34). As seen from the drawing, the support plate 33*c* is located horizontally spaced away from the outer two support plates 5*a*, 5*d* so that no mechanical interference occurs between the support plate 33 and the support plates 5*a*, 5*d* when the latter support plates 5*a*, 5*d* are elevated.

Figure 35:
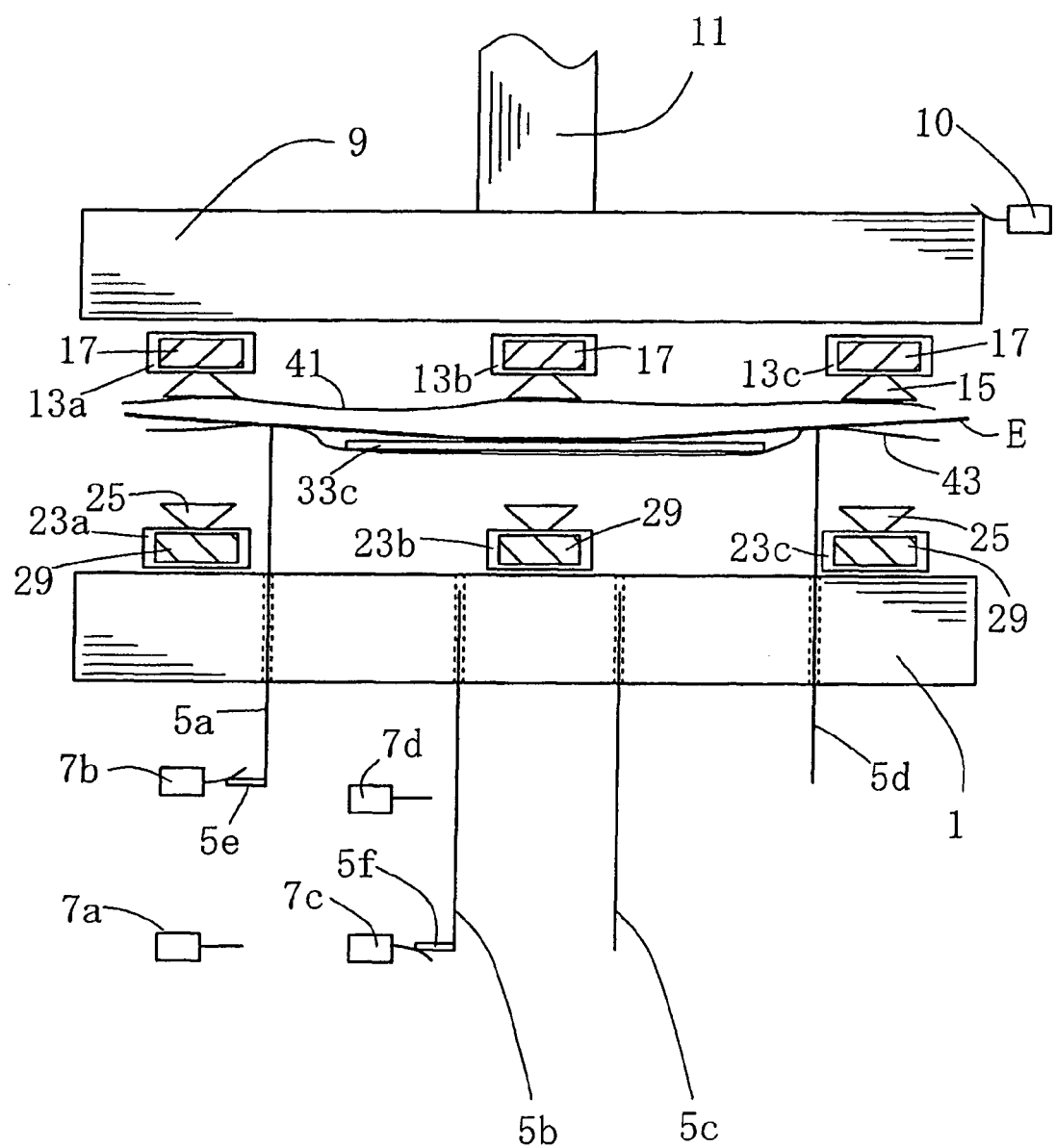
Figure 36:
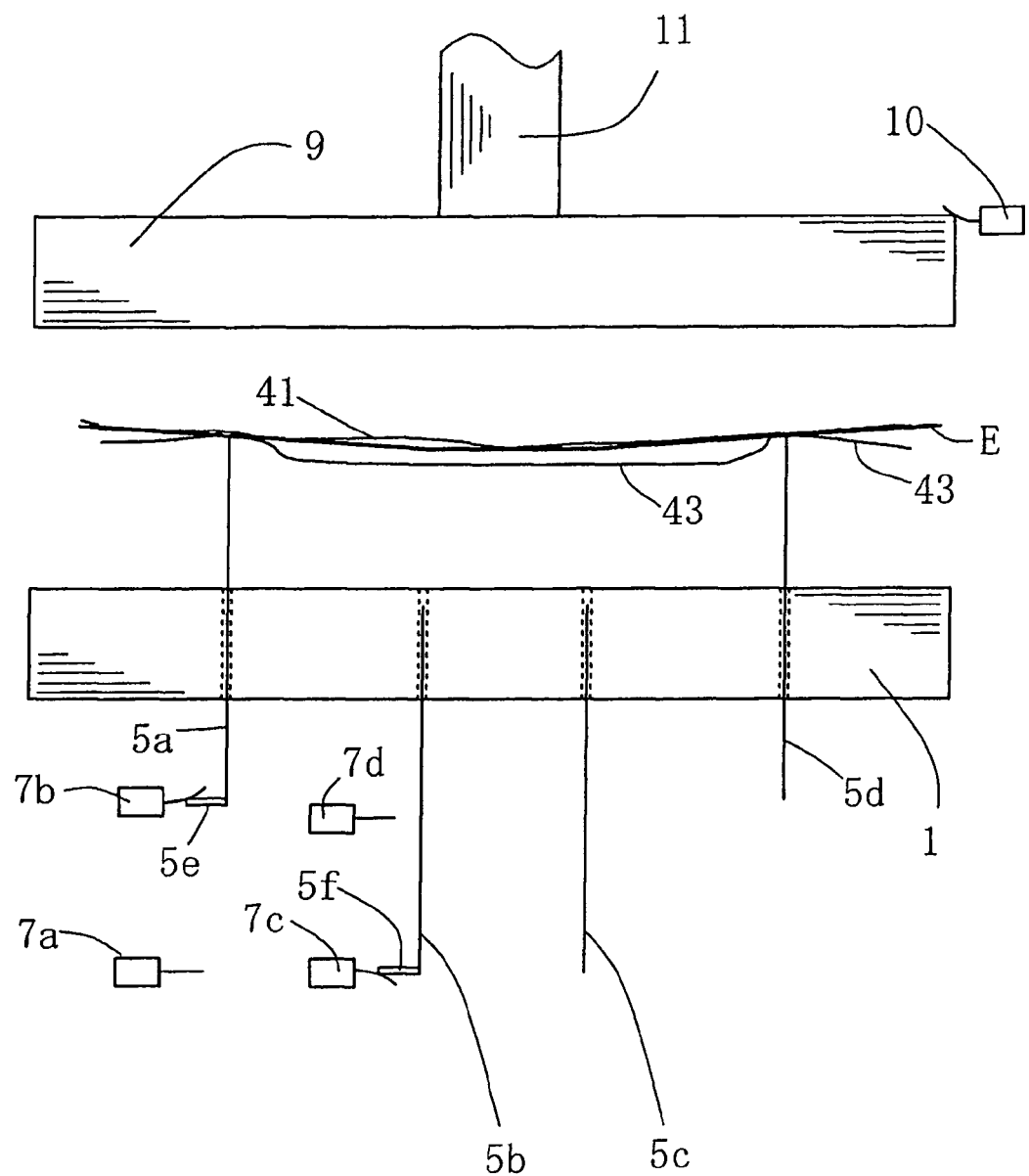

With the first base material E supported by the support plate 33*c* and the veneer sheets 41, 43 held by the first and second veneer feeders 13*a*, 13*b*, 13*c* and 23*a*, 23*b*, 23*c*, as shown in FIG. 34, the support plates 5*a*, 5*d* are elevated so that the veneer sheet 43 and the base material E are supported together by the elevated support plates 5*a*, 5*d* with the top ends thereof brought into contact with the lower veneer sheet 43 at positions adjacent to the longitudinal ends thereof, as shown in FIG. 35. Then, the suction pads 15 of first veneer feeders 13*a*, 13*b*, 13*c* are deactivated thereby to release the veneer sheet 43 onto the base material E, and the first and second veneer feeders 13*a*, 13*b*, 13*c*, 23*a*, 23*b*, 23*c* and the support plate 33*c* are all moved to their retracted positions, as shown in FIG. 36. The support plates 5*a*, 5*d* are moved downward until the limit switch 7*d* is actuated by the projection 5*e* at their lowered position. As a result, the veneer sheets 41, 43 and the first base material E are placed together on the top surface of the lower heated plate 1 in a condition similar to that shown in FIG. 19. The upper heated plate 9 is lowered for hot pressing the veneer sheets 41, 43 and the first base material E in the same manner as described with reference to FIG. 20.

With the veneer sheets 41, 43 and the base material E supported together by the elevated support plates 5*a*, 5*d*, the longitudinally middle portion of the veneer sheet 43 is slackened and droops, as shown in FIG. 36. Therefore, the lower veneer sheet 43 may not be laid on the lower heated plate 1 with its upper surface in intimate contact with the lower surface of the first base material E when the veneer sheets 41, 43 and the first base material E are placed on the lower heated plate 1. In order to prevent such poor contact, in the state of FIG. 36, the inner two support plates 5*b*, 5*c* are elevated so as to support the veneer sheets 41, 43 and the first base material E together at the lower surface of the veneer sheet 43 and thereafter the support plates 5*a*, 5*d* are lowered so that the veneer sheets 41, 43 and the base material E are supported together by the support plates 5*b*, 5*c* in a state similar to that shown in FIG. 18. Subsequently, the support plates 5*b*, 5*c* are lowered, with the result that the veneer sheets 41, 43 and the base material E are placed on the lower heated plate 1, as shown in FIG. 19.

In the preferred embodiments, veneer sheets are laid one on another with the gain thereof oriented generally in the same direction so that a laminated veneer lumber (LVL) is made. According to the present invention, veneer sheets may be laid in such a way that any two adjacent veneer sheets have their grains oriented in perpendicular relation to each other so that a plywood board is made.

In the above-described preferred embodiment, the upper heated plate 9 of the hot press is moved upward after each hot pressing operation to its elevated standby position which is determined by the position of the limit switch 10. As is obvious to those skilled in the art, the time during which the upper heated plate 9 is being moved between the elevated standby position and the lowered hot-pressing position is a loss of time when no productive operation is performed. Particularly, in hot pressing the first two veneer sheets 21, 27, the upper heated plate 9 must move the longest distance to reach its pressing position and, therefore, the longest loss of time is encountered. The distance the upper heated plate 9 moves and hence the loss of time is reduced as the hot pressing is performed repeatedly and the thickness of the base material is increased. Since the thickness of each veneer sheet for lamination by hot pressing is known, the position in vertical direction of the upper surface of a base material supported by the support plates 5a, 5b, 5c, 5d at their elevated position is also known.

Accordingly, in making the first base material E by bonding the first two veneer sheets 21, 27, the first veneer feeders 13a, 13b, 13c are set such that the vertically spaced distance between the lower ends of their suction pads 15 and the top ends of the support plates 5a, 5b, 5c, 5d in their elevated position is about 150 mm, and the upper heated plate 9 in its elevated standby position is set at a spaced distance of about 50 mm from the top of the first veneer feeders 13a, 13b, 13c. In laminating two veneer sheets such as 41, 43 to the base material E, the first veneer feeders 13a, 13b, 13c in their standby position are elevated by a distance corresponding to the thickness of two veneer sheets, or they are position at a spaced distance of 150 mm plus the thickness of two veneer sheets, before being moved to their advanced position within the hot press 1, 9. On the other hand, the upper heated plate 9 in the standby position is also elevated by the same distance corresponding to the thickness of two veneer sheet, or positioned at a spaced distance of 50 mm plus the thickness of veneer sheets, before being lowered to its pressing position. Thereafter, each time two veneer sheets are to be laminated to a base material, the above two spaced distances are increased by the distance corresponding to twice the thickness of veneer sheet.

By so controlling, e.g. in the state of FIG. 15, the standby positions of the first veneer feeders 13a, 13b, 13c and the upper heated plate 9 for each hot pressing operation are set lower than in the preferred embodiment, so that the distance the first veneer feeders 13a, 13b, 13c move downward to the position of FIG. 17 becomes shorter and the distance the upper heated plate 9 moves downward to the position of FIG. 20 for pressing also becomes shorter than in the preferred embodiment, with the result that the loss of time is reduced and the productivity of the apparatus is improved.

For controllably moving and positioning the first veneer feeders 13a, 13b, 13c, one of the first actuators 17 is formed therethrough an internally threaded vertical hole with which a threaded shaft which is driven to rotate by a servo motor is engaged. The first veneer feeders 13a, 13b, 13c can be moved controllably and positioned by providing appropriate control signals to the servo motor. For controllably moving and positioning the upper heated plate 9, on the other hand, the cylinder (not shown) for the upper heated plate 9 is connected to a movable frame of the apparatus through an internally threaded hole formed through the movable frame and a threaded shaft driven to rotate by a servo motor and engaged with the threaded hole. Thus, the upper heated plate 9 can be controllably moved and positioned by providing appropriate signals to the servo motor.

What is claimed is:

1. A method for laying a veneer sheet over a lower surface of a base material which is disposed in a generally horizontal position, comprising:

supporting said base material at the lower surface thereof by a first support means;

placing said veneer sheet immediately below and in facing relation to the lower surface of said base material;

supporting said veneer sheet at the lower surface thereof by a second support means at a position horizontally spaced away from where said first support means supports said base material such that said veneer sheet is caused to bend in either a downward direction or an upward direction;

supporting said base material with the second support means by way of said veneer sheet by executing at least either a step of lowering the first support means or a step of raising the second support means;

moving said first support means away from said base material.

2. The method according to claim 1, wherein said executing at least either said step of lowering the first support means or said step of raising the second support means causes a part of an upper surface of said veneer sheet and a part of the lower surface of said base material to be in contact with each other.

3. The method according to claim 1, further comprising placing said veneer sheet and said base material together on a rigid horizontal surface.

4. The method according to claim 3, wherein said placing said veneer sheet and said base material together on said horizontal surface is accomplished by executing at least one of lowering said second support means and elevating said rigid horizontal surface.

5. The method for laying a veneer sheet over a lower surface of a base material which is disposed in a generally horizontal position, comprising:

supporting said base material at the lower surface thereof by a first support means;

placing said veneer sheet immediately below and in facing relation to the lower surface of said base material;

supporting said veneer sheet at the lower surface thereof by a second support means at a position horizontally spaced away from where said first support means supports said base material such that said veneer sheet is caused to bend in either a downward direction or an upward direction;

supporting said base material with the second support means by way of said veneer sheet by executing at least either a step of lowering the first support means or a step of raising the second support means;

moving said first support means away from said base material; and placing said veneer sheet and said base material together on a rigid horizontal surface by lowering said second support means.

6. A method for laying a veneer sheet of a rectangular shape over a lower surface of a base material which is of a similar rectangular shape and disposed in a generally horizontal position in an apparatus having a rigid support disposed generally in a horizontal position and having a horizontal top surface and at least two slots formed vertically therethrough, a pair of horizontally spaced support members which are movable horizontally between supporting position thereof where the support members support the base material at the lower surface thereof and retract position horizontally away from the base material, said at least two vertical slots being disposed horizontally spaced away from said paired support members, and at least two support plates received in said at least two vertical slots of said rigid support and movable vertically relative to said rigid support between an elevated position thereof where said at least two support plates are positioned with the top ends thereof located at a predetermined distance above said horizontal top surface of the rigid support and lowered position thereof where said top ends are located level with the horizontal top surface of said rigid support, comprising:

supporting said base material at the lower surface thereof by said pair of support members at the supporting position thereof;

placing said sheet immediately below and in facing relation to the lower surface of said base material;

supporting said veneer sheet at the lower surface thereof by said at least two support plates at positions horizontally away from said supporting position such that said veneer sheet is caused to bend in either a downward direction or an upward direction;

making a part of an upper surface of said veneer sheet and a part of said base material to be in contact with each other by executing at least either a step of moving said at least two support plates to the elevated position thereof or a step of lowering said pair of support members;

moving said pair of support members horizontally to their retracted position; and placing said sheet and said base material together on said rigid support by executing at least either a step of moving said at least two support plates to their lowered position or a step of elevating said rigid support.

7. A method for laying a veneer sheet of a rectangular shape over a lower surface of a base material which is of a similar rectangular shape and disposed in a generally horizontal position in an apparatus having a rigid support disposed generally in a horizontal position and having a horizontal flat top and at least two slots formed vertically therethrough and spaced horizontally in the longitudinal direction of said rectangular veneer sheet, a pressing plate disposed above said rigid support, one of said rigid support and said pressing plate being movable relative to the other and said pressing plate being operable with said rigid support to press therebetween said veneer sheet and said base material, a pair of support members which are disposed at a horizontally spaced distance in the longitudinal direction of said rectangular veneer sheet and movable horizontally between supporting position thereof where the support members support the base material at the lower surface thereof at positions adjacent to the opposite longitudinal ends of said rectangular veneer sheet and retract position horizontally away from the base material, said at least two vertical slots being disposed within the horizontal spaced distance of said paired support members, at least two support plates received in said at least two vertical slots of said rigid support and movable vertically relative to said rigid support between elevated position thereof where said at least two support plates are positioned with the top ends thereof located at a predetermined distance above said horizontal top of said rigid support and lowered position thereof where said top ends are located level with the horizontal top of said rigid support, and a veneer sheet feeding mechanism operable to feed a veneer sheet having on one surface thereof an adhesive coating to a position immediately below said base material, comprising:

supporting said base material at the lower surface thereof by said pair of support members at the supporting position thereof;

feeding said veneer sheet by said veneer sheet feeding mechanism to said position immediately below said base material with said adhesive-coated surface of the veneer sheet facing the base material;

supporting said veneer sheet at the lower surface thereof at positions horizontally away from said supporting position by said at least two support plates at the elevated position thereof;

making a part of an upper surface of said veneer sheet and a part of said base material to be in contact with each other by executing at least either a step of moving said at least two support plates to the elevated position thereof or a step of lowering said pair of support members;

moving said pair of support members horizontally to their retracted position;

placing said veneer sheet and said base material together on said rigid support by executing at least either a step of moving said at least two support plates to their lowered position or a step of elevating said rigid support; and pressing said veneer sheet and said base material by said rigid support and said pressing plate.

8. The method according to claim 2, further comprising placing said veneer sheet and said base material together on a rigid horizontal surface.

9. The method according to claim 8, wherein said placing said veneer sheet and said base material together on said horizontal surface is accomplished by executing at least one of lowering said second support means and elevating said rigid horizontal surface.

* * * * *